United States Patent
Alfieri et al.

(10) Patent No.: US 9,938,726 B2
(45) Date of Patent: Apr. 10, 2018

(54) DENSIFIED FOAM CORE (DFC) TILE WITH IMITATION GROUT LINE

(71) Applicants: Michele Alfieri, Quebec (CA); Stephen Courey, Quebec (CA)

(72) Inventors: Michele Alfieri, Quebec (CA); Stephen Courey, Quebec (CA)

(73) Assignee: Quickstyle Industries Inc., Quebec (CA)

( * ) Notice: Subject to any disclaimer, the term of this patent is extended or adjusted under 35 U.S.C. 154(b) by 0 days.

(21) Appl. No.: 15/454,650

(22) Filed: Mar. 9, 2017

(65) Prior Publication Data

US 2018/0058077 A1  Mar. 1, 2018

Related U.S. Application Data

(60) Provisional application No. 62/380,122, filed on Aug. 26, 2016.

(51) Int. Cl.
| | |
|---|---|
| *E04F 15/02* | (2006.01) |
| *E04F 15/10* | (2006.01) |
| *B32B 27/30* | (2006.01) |
| *B32B 27/06* | (2006.01) |
| *B32B 3/26* | (2006.01) |
| *B32B 7/12* | (2006.01) |

(52) U.S. Cl.
CPC ........ *E04F 15/02033* (2013.01); *B32B 3/263* (2013.01); *B32B 7/12* (2013.01); *B32B 27/065* (2013.01); *B32B 27/304* (2013.01); *E04F 15/02038* (2013.01); *E04F 15/107* (2013.01); *B32B 2307/72* (2013.01); *B32B 2419/04* (2013.01)

(58) Field of Classification Search
CPC .............................. B23B 27/304; B23B 27/30
See application file for complete search history.

(56) References Cited

U.S. PATENT DOCUMENTS

| | | | |
|---|---|---|---|
| 6,363,677 B1 | 4/2002 | Chen et al. | |
| 7,288,310 B2 * | 10/2007 | Hardwick | B32B 27/30 428/130 |
| 8,956,714 B2 | 2/2015 | Vermeulen | |
| 9,127,459 B2 | 9/2015 | Litral | |

(Continued)

FOREIGN PATENT DOCUMENTS

WO    WO2013117653    8/2013

*Primary Examiner* — Rodney Mintz
(74) *Attorney, Agent, or Firm* — Malloy & Malloy, P.L.

(57) ABSTRACT

A flooring tile having a plurality of sides, at least a top layer, a core layer comprising a densified foam material, and an exposed portion that extends outwardly along one side with a textured surface that imitates a grout line. The top layer of the tile can include a top surface defined by a wear layer, a polyvinyl chloride (PVC) layer having an optimal density and a dye or colorant(s), and a decorative layer. The exposed portion may be formed on the PVC layer below the top surface of the tile at a depth of about 0.9 millimeters (0.035 inches) to 2 millimeters (0.079 inches), or more, so as to extend into the core layer, and will have a width of generally between 2 millimeters (0.079 inches) to 5 millimeters (0.197 inches). The overall thickness of the tile ranges from 4 millimeters (0.157 inches) to 8 millimeters (0.315 inches).

21 Claims, 18 Drawing Sheets

(56) References Cited

U.S. PATENT DOCUMENTS

| | | | |
|---|---|---|---|
| 2003/0138618 A1* | 7/2003 | Courtoy | B29C 59/046 428/308.4 |
| 2004/0146695 A1* | 7/2004 | Hardwick | B32B 27/30 428/157 |
| 2006/0159891 A1* | 7/2006 | Viet | B32B 27/12 428/172 |
| 2007/0125021 A1 | 6/2007 | Thiers et al. | |
| 2010/0055420 A1 | 3/2010 | Vermeulen | |
| 2010/0319294 A1* | 12/2010 | Courey | B32B 3/06 52/591.4 |
| 2011/0146189 A1* | 6/2011 | Courey | B32B 7/04 52/588.1 |
| 2011/0167744 A1 | 7/2011 | Whispell et al. | |
| 2011/0300392 A1 | 12/2011 | Vermeulen | |
| 2012/0240502 A1* | 9/2012 | Wilson | E04F 15/14 52/416 |
| 2013/0104486 A1 | 5/2013 | Windmoller | |
| 2014/0109507 A1 | 4/2014 | Dossche et al. | |
| 2014/0290158 A1 | 10/2014 | Meersseman et al. | |
| 2015/0147531 A1* | 5/2015 | Anspach | E04F 15/0215 428/172 |
| 2015/0167320 A1 | 6/2015 | Meersseman et al. | |
| 2015/0239230 A1* | 8/2015 | Vermeulen | B44C 5/0476 101/27 |
| 2016/0347085 A1* | 12/2016 | Cloots | B44C 5/04 |
| 2016/0375718 A1* | 12/2016 | Van Garsse | B44C 5/04 52/311.1 |
| 2017/0009462 A1* | 1/2017 | Muehlebach | E04F 15/02 |
| 2017/0044778 A1* | 2/2017 | Brickner | E04F 15/107 |

\* cited by examiner

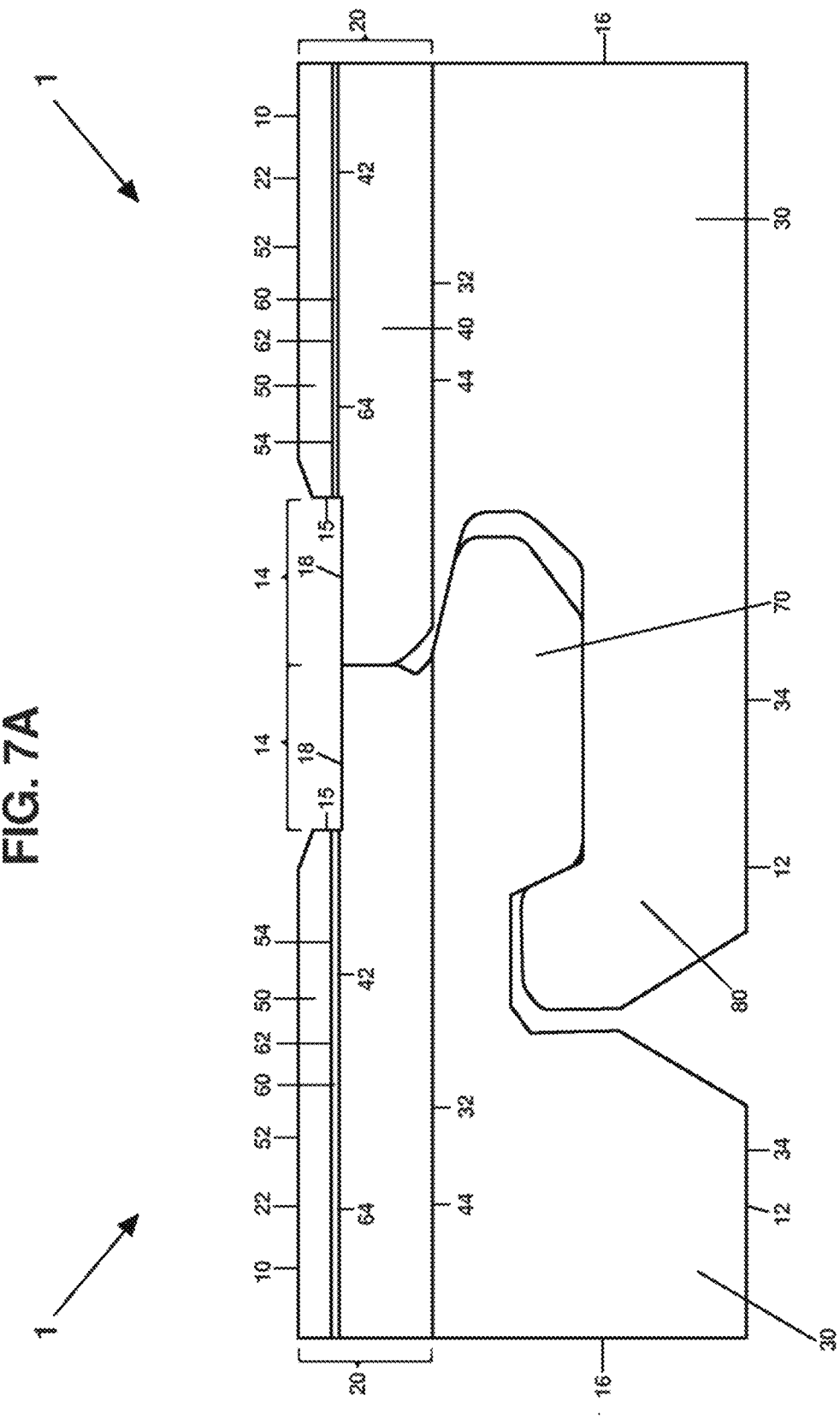

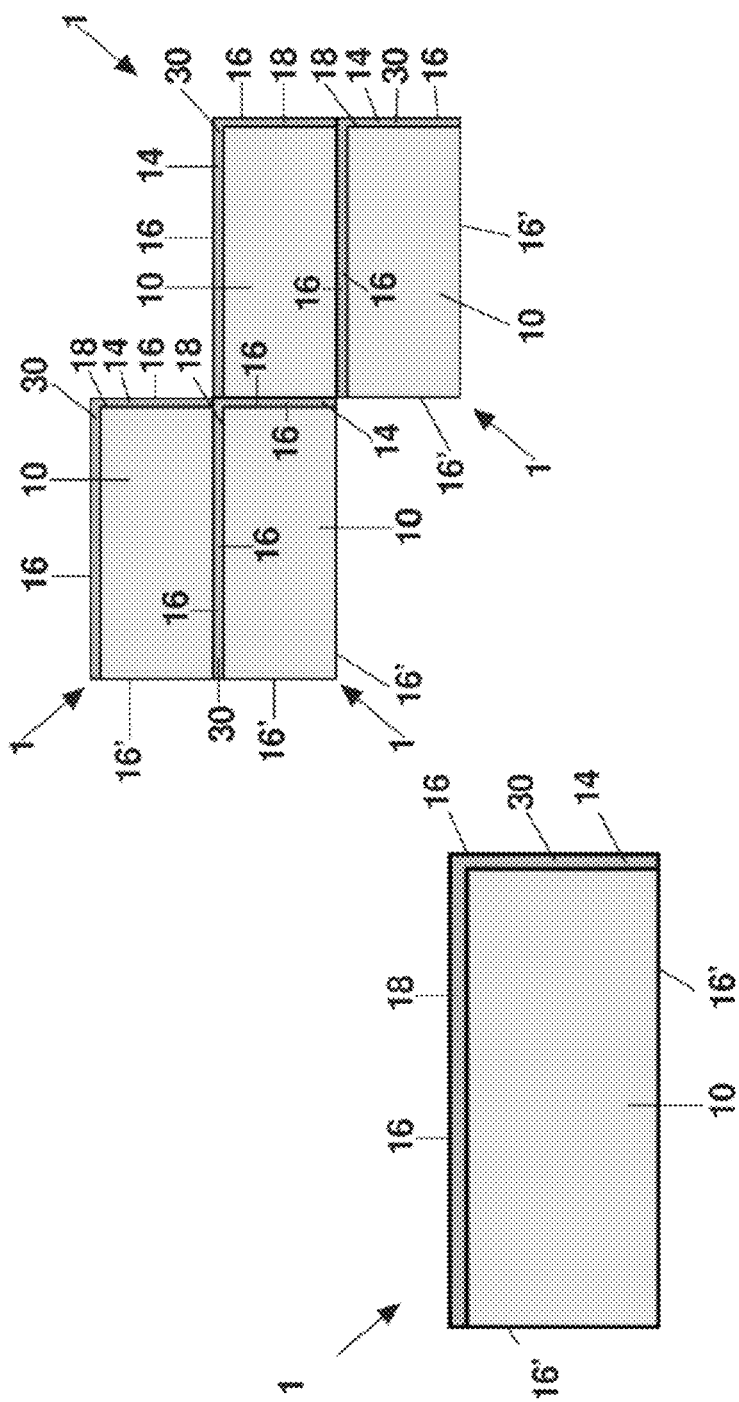

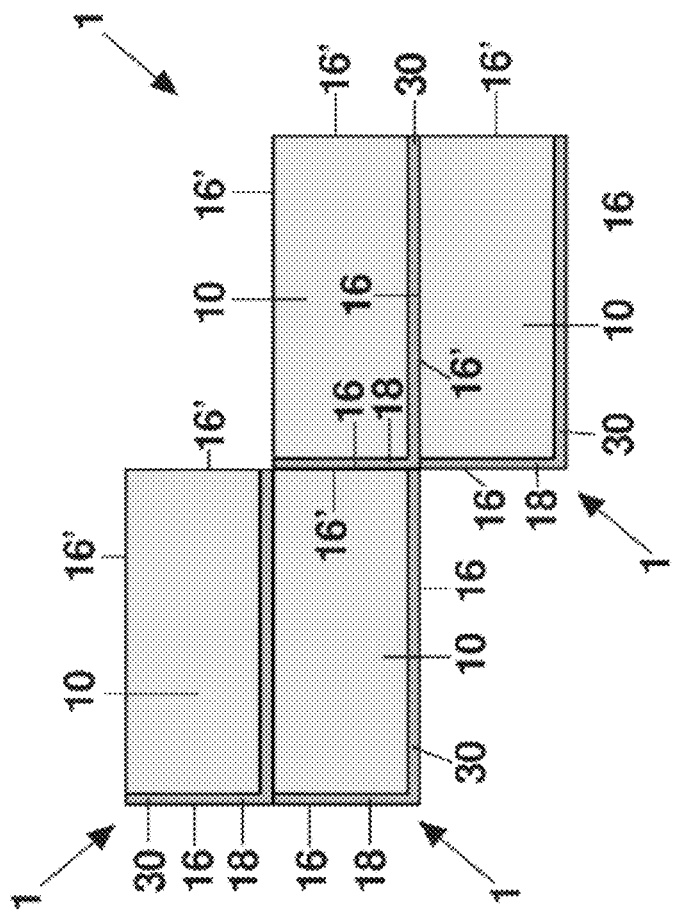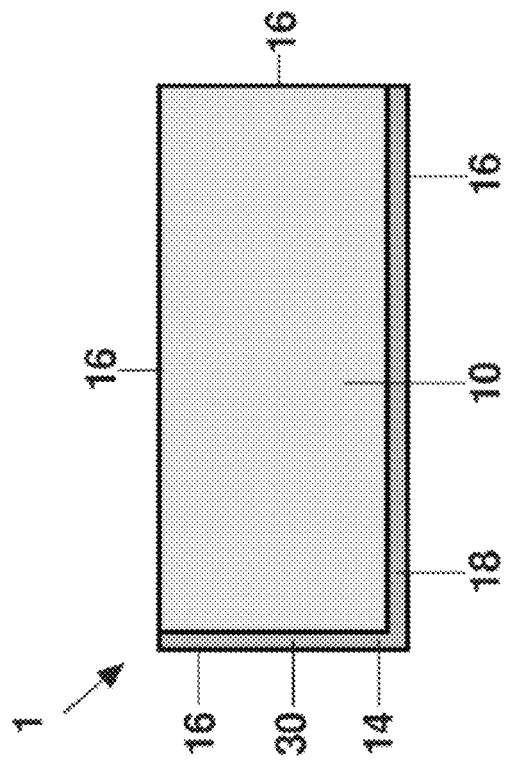

DENSIFIED FOAM CORE (DFC) TILE WITH IMITATION GROUT LINE

CLAIM OF PRIORITY

The present invention claims priority under 35 U.S.C. Section 119(e) to a U.S. provisional patent application Ser. No. 62/380,122 and a filing date of Aug. 26, 2016, which is incorporated herein by reference in its entirety.

BACKGROUND OF THE INVENTION

Field of the Invention

The present invention is directed to a tile, such as a flooring tile, made from synthetic materials and having an appearance of real marble, stone, ceramic or wood, and which offers a highly realistic looking but imitation grout line formed along the length of one or more of its sides. The inventive tile comprises at least a top layer and a core layer, and during the manufacturing process, at least a portion of the top layer is removed along at least one side thereof to define an exposed portion along the side of the tile, which extends outwardly below and away from the top surface of the tile. The exposed portion of the tile additionally comprises a textured surface to closely resemble the look and feel of an actual grout line, and may include a colorant to correspond with the overall intended color of the resulting tile.

Description of the Related Art

During the construction of a home, building or other structure, there will almost always be an unfinished floor surface such as a slab of concrete, a wood sub-structure or the like, which needs to be finished to offer a more appealing and/or polished appearance. This is also true of most unfinished wall surfaces. In many cases, tiles will be used to finish either a floor surface or a wall surface, with the tiles often being made of real marble or stone, or depending on budgetary constraints, of porcelain or ceramic. Traditionally, such tiles are secured to the unfinished floor slab or wall surface using a cement-like mixture, with one or more tiles disposed closely next to each other, and leaving a small separation between the sides of adjacent tiles. Forming this separation between tiles is often tedious and requires the use of spacers to ensure uniformity and alignment of the tiles. Also, this separation will later be filled with a grout mixture as part of the installation process, which creates a "grout line" around the sides of the tiles. In general, the process of installing tile and creating the grout line involves a significant amount of time, which adds to the labor and overall cost of the project.

Over the last several years, flooring products and tiles have been made from synthetic materials and configured to imitate the look of a real tile of marble, stone or ceramic. For example, laminate and vinyl flooring products are known, including some that imitate the look of real stone, marble, or ceramic tiles. These flooring products create an optical or visual illusion so that the surface of the tile looks like real stone, marble or ceramic or even like real wood flooring. Traditionally, however, such flooring products are manufactured so as to require that the individual tiles be installed directly next to each other, often in abutting relation, although some of these products are installed with a slight separation between them to facilitate installation on uneven floor surfaces. While this slight separation may be observable and in some cases may appear as a small seam or even as a micro groove, these types of known tiles do not offer any structure to represent or closely resemble the look and feel of a real grout line. This is also true of existing imitation flooring products having an internconnecting mechanism to facilitate installation, such as correspondingly disposed "tongue" and "groove" structures formed along a side of a tile. Additionally, some laminate flooring planks are known to offer an optical illusion of having a grout line, but in reality, the seams of such flooring planks and/or tiles are completely flat and have imitation grout lines drawn and shaded on the edges by an artist to give the impression of depth.

While such flooring products or tiles exist, none are believed to have ever featured a layer of polyvinyl chloride (PVC) having an optimal density so that a portion thereof can be exposed during the manufacturing process to form an imitation grout line with a highly realistic look and feel of an actual grout line. Furthermore, no such tiles or flooring products are believed to have ever featured a layer of polyvinyl chloride (PVC) combined with a colorant during the manufacturing process so as to provide a variety of colors for the imitation grout line that will match with or closely correspond to the overall color of the resulting tile.

Accordingly, it would be beneficial if a tile or flooring product made from synthetic materials, such as but not limited to polyvinyl chloride (PVC), were developed to offer both the look and feel of an actual grout line, and also, so as to be capable of being made in a variety of different colors and designs, and further, which is capable of being easily and quickly installed.

Additionally, if any such improved tile or flooring product were developed, it would also be beneficial if it could be made from material(s) that is/are sufficiently rigid and durable for a wide variety of applications, and also capable of being readily formed during the manufacturing process to achieve a texture on selected portions that matches the look and feel of an actual grout line.

SUMMARY OF THE INVENTION

The present invention is intended to present a solution to these and other needs which remain in this field of art, and as such, is directed to a tile, primarily but not exclusively intended for use in flooring applications, that imitates the look and feel of a real tile surface such as stone, ceramic, or marble, and the like, including the look of wood flooring, and further, which is formed from material(s) that can be made in a variety of different colors and designs. The present invention is also directed, however, to a tile that is structured to have an imitation grout line, but with a highly realistic look and feel similar to an actual grout line, formed on or substantially along at least one side or edge of the tile. Additionally, the tile of the present invention may be manufactured in different dimensions of varying length and width, and may also be produced in a variety of shapes such as, but not limited to, rectangular, square, hexagonal, or octagon, and others.

As will become clear from the description which follows, the tile of the present invention comprises at least a top layer and a core layer. The top layer is generally a layer made from a vinyl composite material, including a synthetic plastic polymer such as, but not limited to, polyvinyl chloride (PVC). In most embodiments, the top layer of the inventive tile comprises at least one PVC layer. However, in at least one preferred embodiment, the top layer additionally comprises both a wear layer and/or a decorative layer. Also, the top layer of the tile, and particularly the wear layer in said one or more embodiments, is formed to have a selected thickness depending upon the intended use of the tile such as residential, light contract, heavy commercial, or other type of use. Moreover, the density of the polyvinyl chloride (PVC) layer material is such that the inventive tile(s) may be readily modified during the manufacturing process to achieve the desired effect of offering a highly realistic looking grout line when viewed by a person standing on or near the floor surface, such as 5 to 6 feet away or more. Also during the manufacturing process, the top surface of the tile, defined by the top layer and specifically, by the wear layer in one or more embodiments, may be pressed or otherwise modified to achieve a variety of textured surfaces thereon, which help to provide the tile with an appearance of real marble, stone, ceramic or of a real wood surface or other natural textures.

The core layer of the inventive tile may be formed from a "densified foam" material. More specifically, the core layer preferably comprises a densified foam material such as, but not limited to, a Wood Plastic Composite ("WPC") material, and further, will preferably be waterproof. Also, the material composition and density range of the densified foam ensure that the core layer, and consequently the tile(s), is/are sufficiently rigid and durable for flooring applications. Additionally, the core layer may have a smooth texture and may comprise one or more sublayers that serve as an underlayment or a sound barrier. These sublayers may be made from other materials such as, but not limited to, laminate foil, cork, foam, or ethyl vinyl acetate.

The inventive tile also comprises an exposed portion that extends outwardly from and along the length of at least one side of the tile. The exposed portion is associated with a sidewall and defines a gap that preferably extends uniformly and substantially along the side of the tile. The exposed portion additionally comprises a textured surface structured to closely simulate the appearance of a real grout line. As illustrated in several of the Figures, the exposed portion is formed along at least one side of the inventive tile, but in other embodiments, may be disposed along more than one side or even along all sides of the tile. This exposed portion is preferably formed on the tile during the manufacturing process, as opposed to during installation. During the manufacturing process, a tool, such as but not limited to a knife, cutting blade(s) and the like, may be configured and used to remove a portion of the top surface of the tile uniformly along at least one selected side thereof, and will expose at least a portion of the top layer of the tile, and in some embodiments may expose a portion of the core layer. Additionally, the knife, cutting blade(s) or other tool may also modify the exposed portion, such as by further cutting and/or profiling of it so as to provide the textured appearance that closely simulates the look and feel of a real grout line.

Additional features of the tile of the present invention include an interconnecting mechanism formed on at least one side of the tile to facilitate installation. For example, the interconnecting mechanism may comprise a "tongue" formed along one side of a tile, and a "groove" formed along one side of a different tile, and which are cooperatively structured to be matingly interconnected so as to join two different tiles together along their correspondingly disposed sides. Additionally, the "tongue" side and/or the "groove" side may each be configured to accommodate the exposed portion defining a gap along a side or edge of the tile.

Other features of the tile of the present invention include a bevel comprising a slanted edge, formed on the side(s) of the tile, and specifically, adjacent to the exposed portion of the tile and textured surface. The sidewall associated with the exposed portion may include the bevel at an upper portion thereon, and in general, the bevel helps to more closely simulate the look and feel of a real grout line. The bevel may be formed in a variety of sizes, but in one embodiment, the angle of inclination of the bevel, with respect to the top surface of the tile, will be in a range between about 30° to about 90° although in an illustrated embodiment, this angle will be closer to about 12°. In general, in embodiments having a bevel, the intended width of the resulting simulated grout line will be a factor in determining the steepness of a corresponding angle of inclination. For example, a steeper angle of inclination may correspond to a grout line having a smaller width, while a less steep angle of inclination may correspond to a grout line having a larger width. Alternatively, the bevel may have a modified structure, such as a two staged descent from the top surface of the tile to the exposed portion and textured surface simulating a grout line. In another embodiment, the bevel may comprise a "micro" bevel.

A primary object of the present invention is to provide a tile suitable for use as a flooring surface, which is made from synthetic materials and closely imitates the look of real stone, marble, ceramic or even wood flooring, but which also offers an imitation grout line with a highly realistic look and feel similar to that of an actual grout line.

Another primary object of the present invention is to provide an inventive tile made from synthetic material(s) that can be readily formed during the manufacturing process to define an exposed portion including a gap substantially or entirely along a selected side thereof and that can be readily profiled to achieve a texture surface thereon which closely matches the look and feel of an actual grout line.

Yet another primary object of the present invention is to provide a tile with a highly realistic looking and yet imitation grout line that can also be manufactured in variety of colors so as to offer a close match with and consistency of color relative to the overall color of the resulting tile, which has not been achieved before in any existing products.

An advantage of the tile of the present invention in at least some embodiments is that the material(s) used to make it is/are sufficiently rigid and durable for a wide variety of applications, and is/are also waterproof.

A feature of the tile of the present invention is that in at least some embodiments there is an interconnecting mechanism formed along at least one edge thereof or more that facilitates the assembly and installation process.

Another advantage of the tile of the present invention is that the materials(s) used to make it are capable of assuming a variety of different shapes, colors and/or designs.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description, as taken in connection with the accompanying drawings, in which:

FIG. 7-B is also a transverse sectional view of a tile according to the present invention in yet another embodiment comprising at least a top layer, and a core layer, along with an interconnecting mechanism, and illustrating an exposed portion having an imitation grout line formed on the core layer.

FIG. 15-B is a plan view of several tiles, each similar to the tile depicted in FIG. 15-A with an exposed portion and imitation grout line formed on all of its sides, interconnected together to create a floor or wall covering.

FIG. 16-A is a plan view of another preferred embodiment according to the present invention showing a tile comprising an exposed surface with an imitation grout line formed on two of its sides.

FIG. 16-B is a plan view of several tiles, each similar to the tile depicted in FIG. 16-A with an exposed portion and imitation grout line formed on two of its sides, interconnected together to create a floor or wall covering.

FIG. 17-A is a plan view of another preferred embodiment according to the present invention showing a tile comprising an imitation grout line formed on two adjacent sides.

FIG. 17-B is a plan view of another preferred embodiment according to the present invention showing a plurality of interconnected tiles each comprising an imitation grout line formed on two adjacent sides.

Like reference numerals refer to like parts throughout the several views of the drawings.

DETAILED DESCRIPTION OF THE INVENTION IN PREFERRED EMBODIMENT(S)

The present invention is directed towards a tile 1, such as a flooring tile, made from synthetic materials and so as to imitate the look and feel of real stone, marble, ceramic, wood or other materials, but which is further structured to offer a simulated grout line, with a highly realistic look and feel, on or along at least one side or edge of the tile 1. While the tile 1 of the present invention is particularly well suited for use as a flooring tile, it may also readily be used on wall surfaces or in a variety of other applications, and should not be considered as being limited only to flooring applications.

Figure 1:
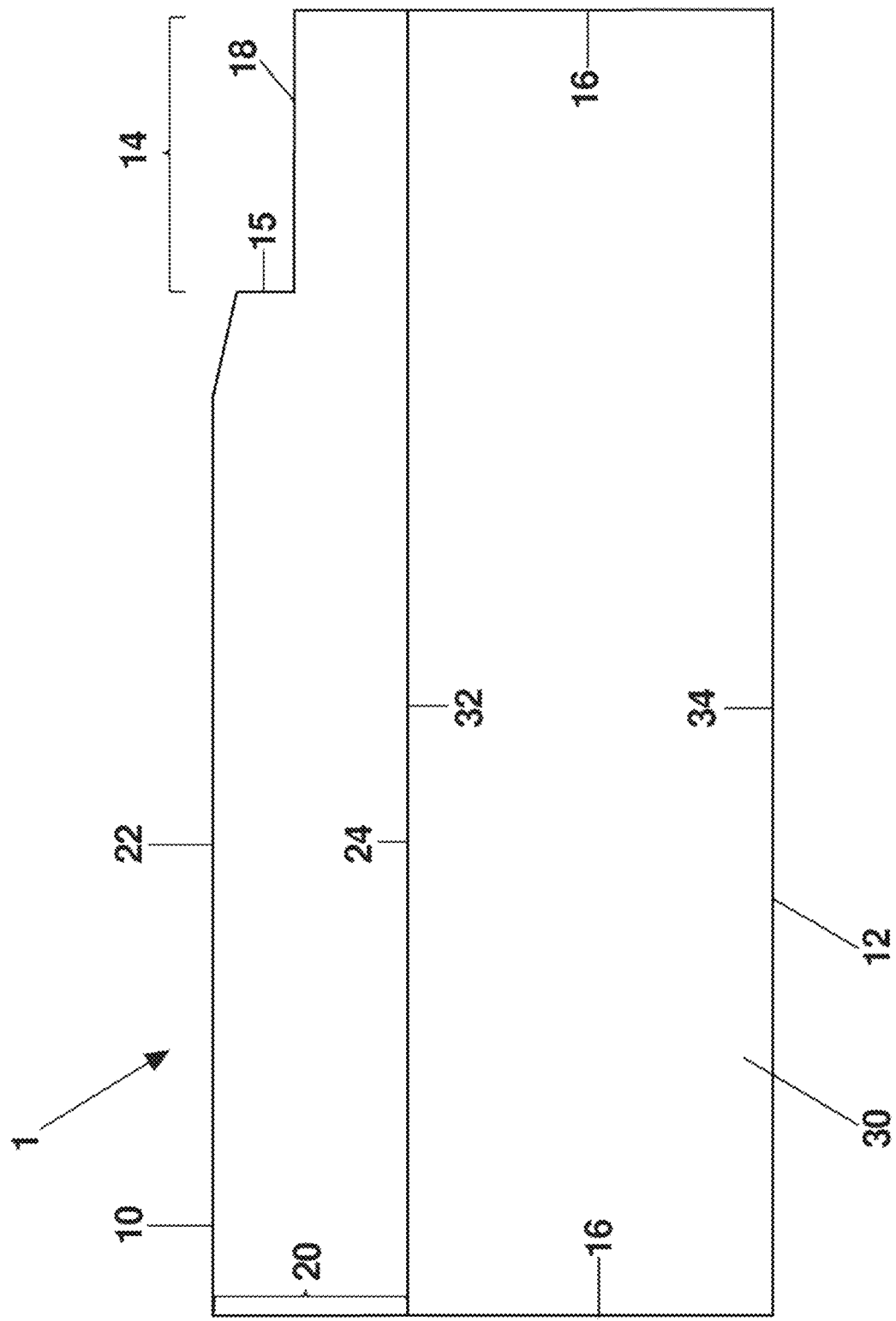
FIG. 1 is a transverse sectional view of a tile in accordance with the present invention comprising a top layer and a core layer, and illustrating an exposed portion formed in the top layer.
Figure 8:
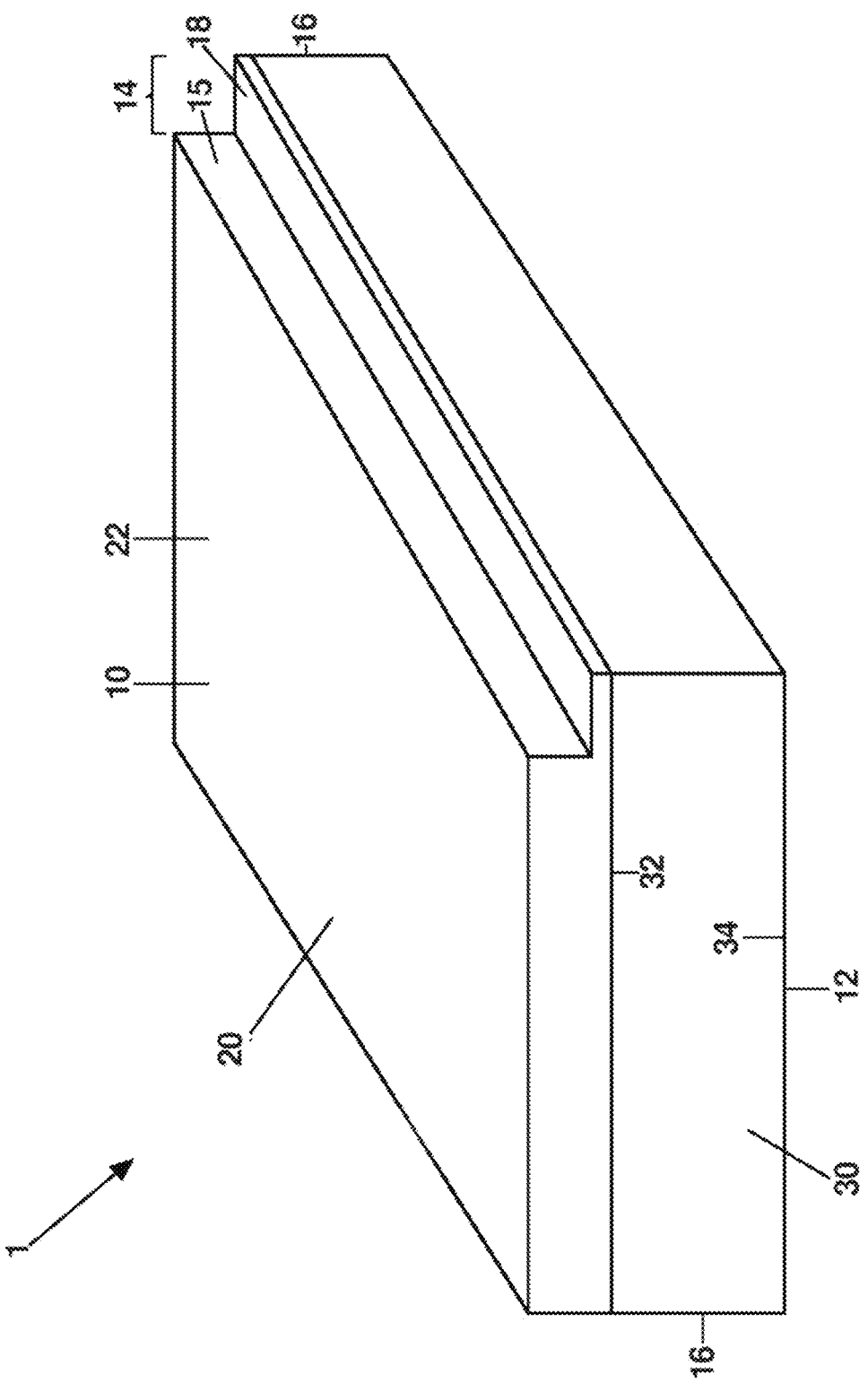
FIG. 8 is a perspective view of the embodiment of the invention shown in FIG. 1 comprising a top layer and a core layer.

In general terms, the tile 1 of the present invention comprises an upper or top section, a lower or core section, and a plurality of sides. For example, and with reference to FIGS. 1 and 8, the upper or top section may be defined by a top layer 20, and the lower or core section may be defined by a core layer 30. As shown in FIG. 1, the top layer 20 comprises a first surface 22 that at least partially defines a top surface 10 of the tile 1, as well as a lower or second surface 24. The core layer 30 comprises an upper or third surface 32 adhered to or otherwise connected to the lower or second surface 24 of the top layer 20, so as to join the top layer 20 and core layer 30 together. The core layer 30 also comprises a fourth surface 34 that generally defines the bottom surface 12 of the tile 1, which will be adhered to an unfinished slab of concrete or other floor surface in a building. In some embodiments, however, the core layer 30 can include sublayers, such as a sound proofing or other material.

The tile 1 of the present invention may be formed in part from a vinyl material or a vinyl composite material, and may be referred to as a Vinyl Composite Tile (VCT). Although the top or upper section may be formed from a variety of materials, vinyl material(s) are preferred for a number of reasons, including the ability to offer a quality product at an affordable price point. The top layer 20 will be formed entirely, or at least in part, from a vinyl composite or synthetic plastic polymer such as polyvinyl chloride (PVC). Also, and as described more in detail herein, the top layer 20 will include in most embodiments a layer of polyvinyl chloride (PVC), such as a plasticized PVC that is mixed with a dye or colorant(s), and having an optimal density for allowing a realistic looking grout line to be readily and consistently formed.

Figure 2:
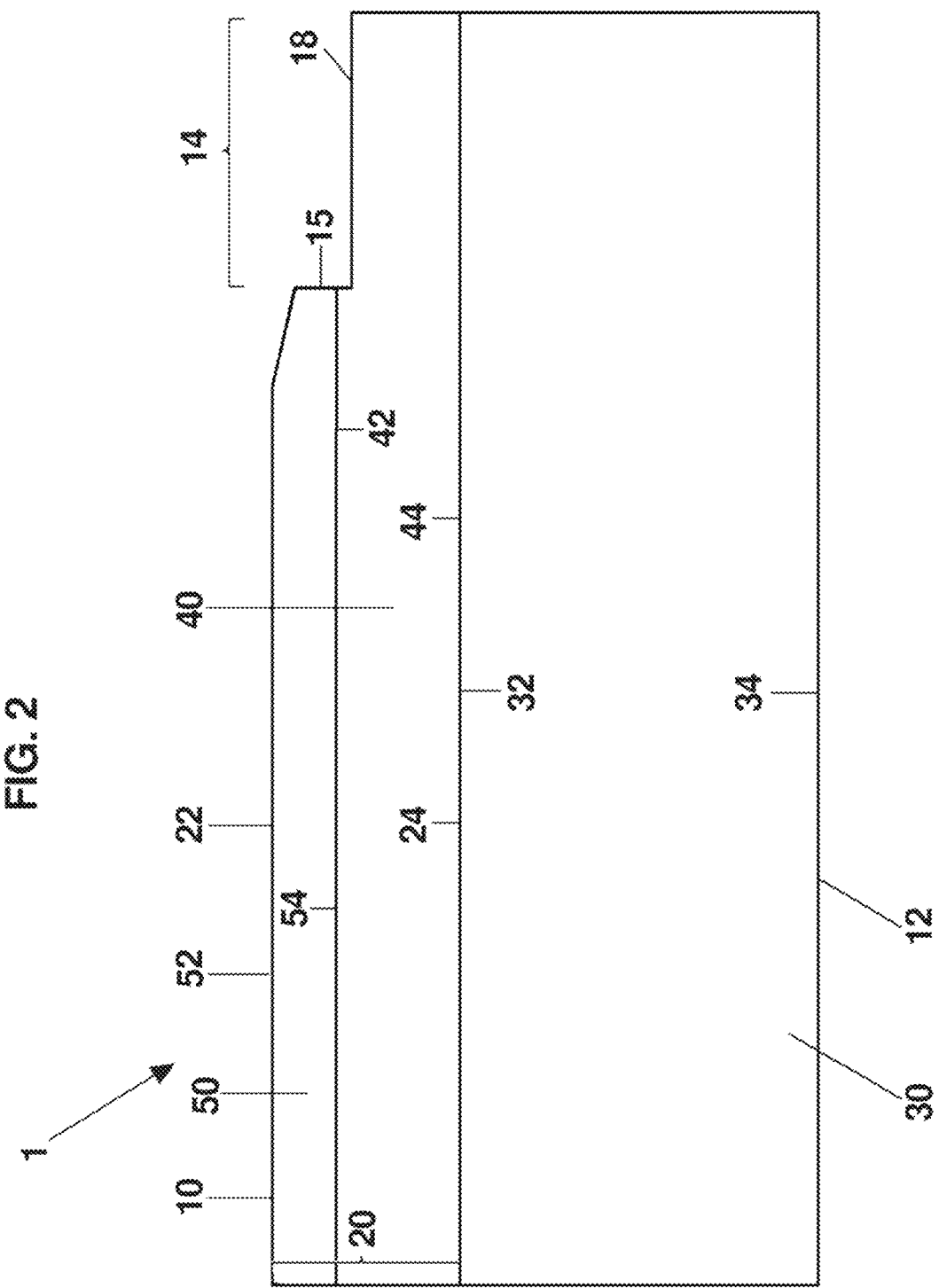
FIG. 2 is also a transverse sectional view of a tile in accordance with the present invention comprising a top layer and a core layer similar to FIG. 1, but illustrating the top layer as including both a polyvinyl chloride (PVC) layer and a wear layer.
Figure 3:
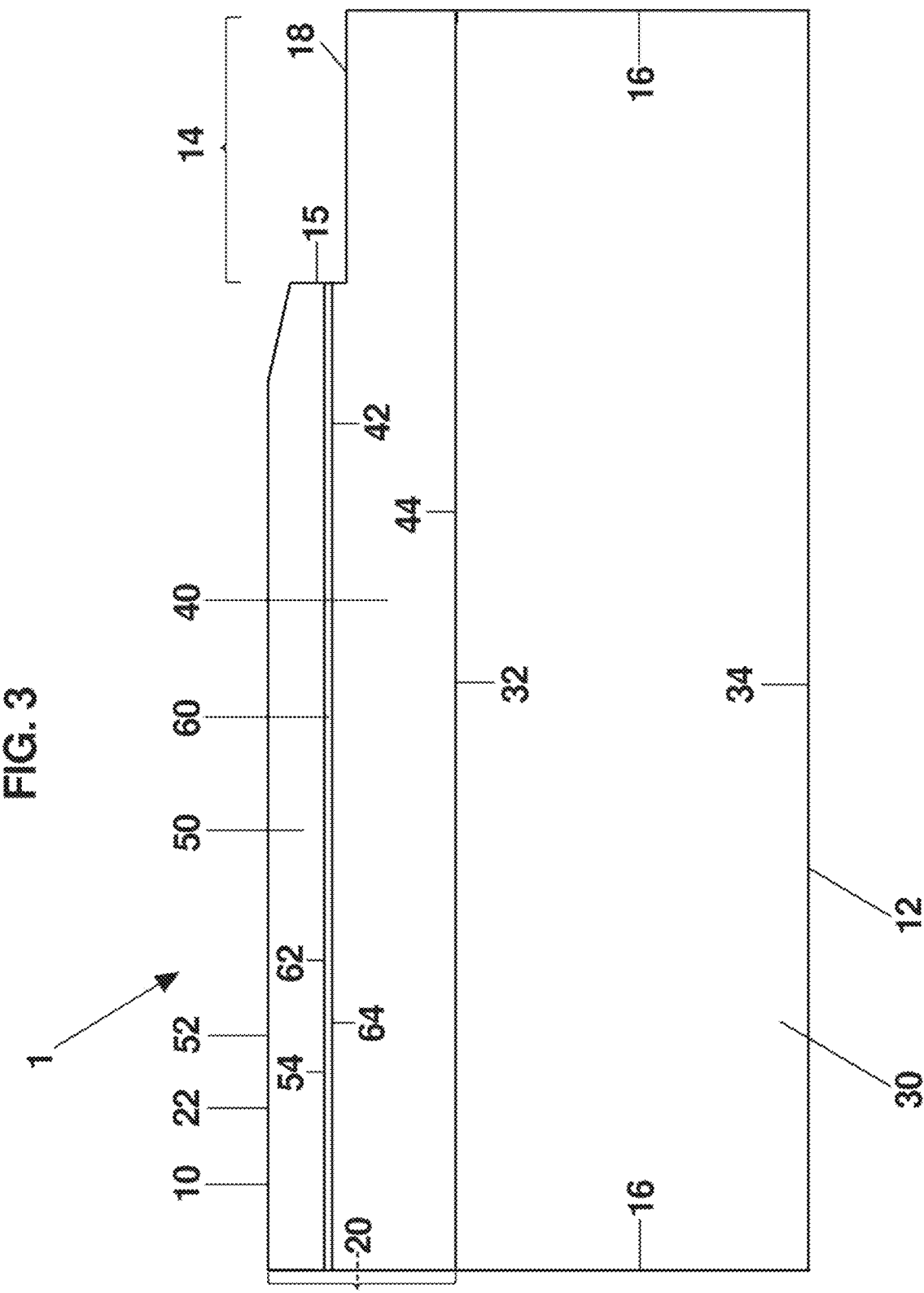
FIG. 3 is also a transverse sectional view of a tile in accordance with the present invention comprising a top layer and a core layer similar to FIG. 1, but illustrating the top layer as including a polyvinyl chloride (PVC) layer, a decorative layer and a wear layer.
Figure 4:
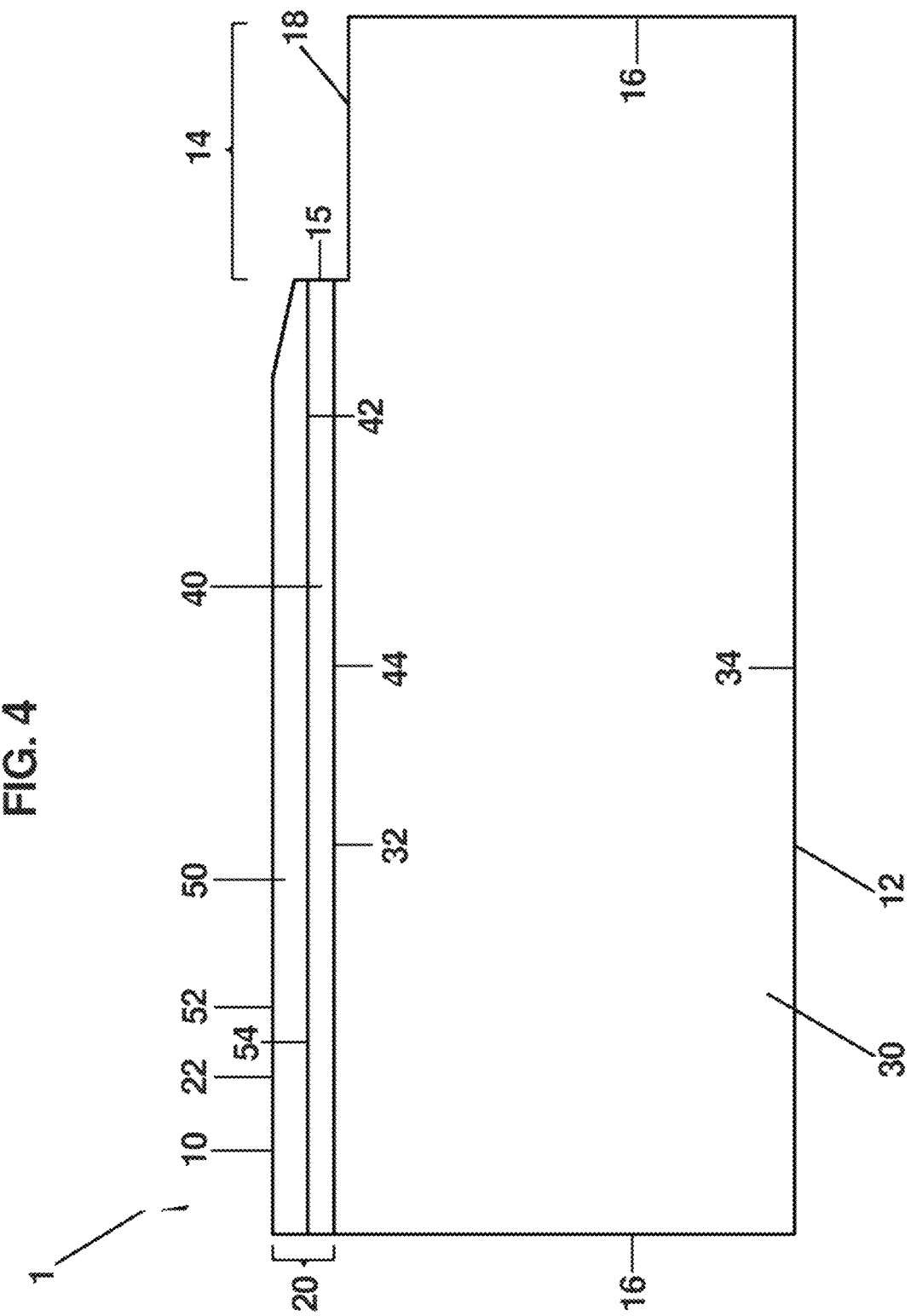
FIG. 4 is also a transverse sectional view of a tile in accordance with the present invention comprising a top layer and a core layer similar to FIG. 2, including the top layer having a polyvinyl chloride (PVC) layer and a wear layer, but illustrating the exposed portion formed on the core layer.

With reference now to FIGS. 2 through 7-B, and 9-11, in some embodiments the top layer 20 will comprise additional layers. For example, and as shown in FIGS. 2 and 4, the top layer 20 is illustrated as comprising a wear layer 50 and a polyvinyl chloride (PVC) layer 40. In these and other embodiments, the wear layer 50 includes a top surface 52 which is entirely or at least partially coincident with the top surface 10 of the tile. The wear layer 50 may vary in thickness according to its intended use such as residential, light contract, heavy commercial or other type of use. The wear layer 50 will preferably be formed during the manufacturing process so as to include one or more design features, such as a texture with some undulation to imitate the look and feel of real stone or marble or a texture that has grooves and/or other impressions to imitate the look and feel of, for example, a real piece of wood. In the embodiments shown in FIGS. 2 and 4, the polyvinyl chloride (PVC) layer 40 is generally disposed between the wear layer 50 and the core layer 30. For example, the polyvinyl chloride (PVC) layer 40 may be connected at its upper surface 42 by way of adhesives and/or pressing to a lower surface 54 of the wear layer 50, and similarly connected at its lower surface 44 to an upper surface 32 of the core layer 30. The polyvinyl chloride (PVC) layer 40 may comprise a material of synthetic plastic polymer such as polyvinyl chloride (PVC) or may be made so as to include other materials. However, since it includes polyvinyl chloride (PVC) it will be referred to herein throughout as the polyvinyl chloride (PVC) layer 40. In the preferred embodiments the polyvinyl chloride (PVC) layer 40 has a density in a range of between generally about 2,000 kg/m$^3$ (which is about 124.856 lb/ft$^3$) to about 2,400 kg/m$^3$ (which is about 149.827 lb/ft$^3$).

Figure 9:
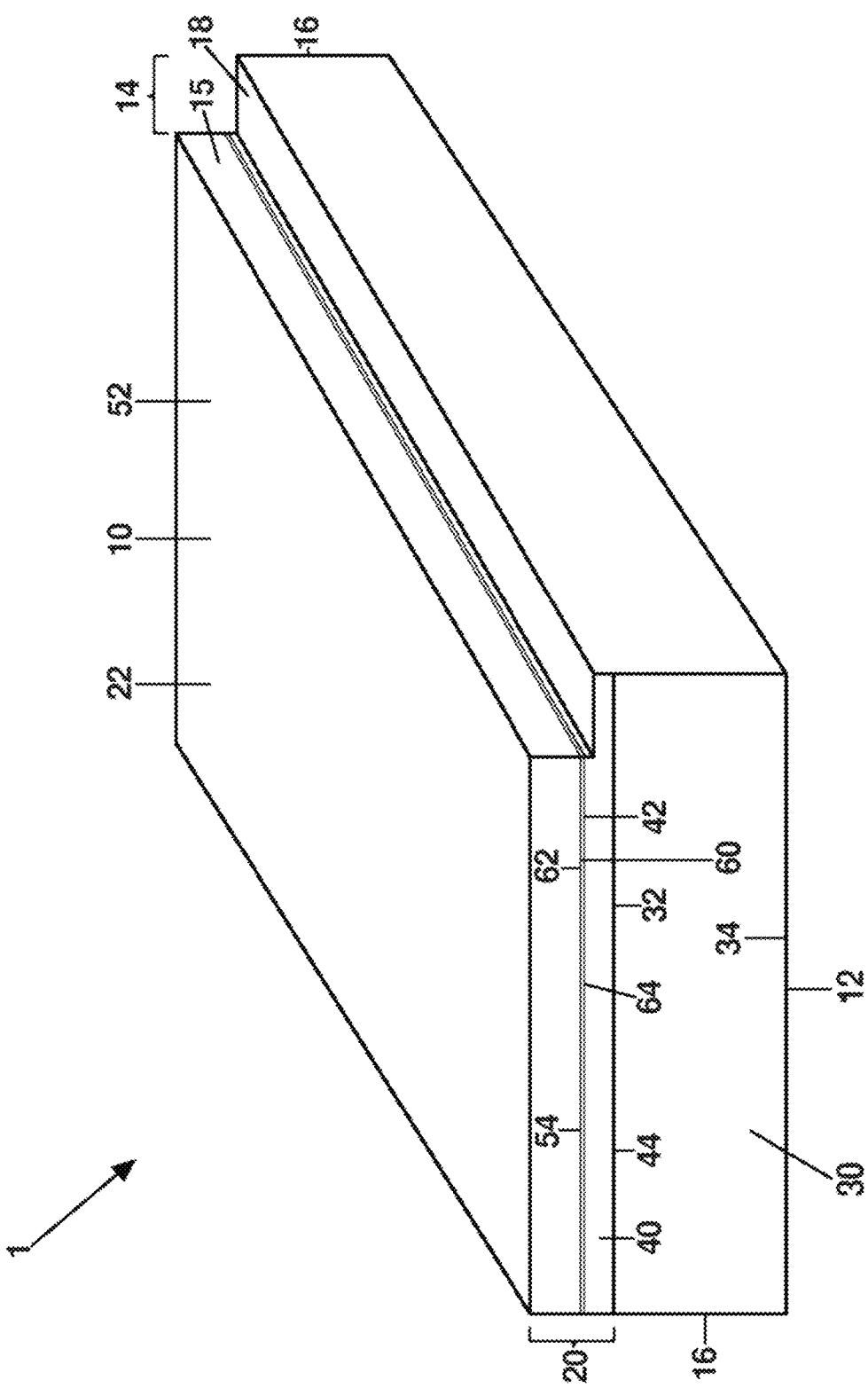
FIG. 9 is also a perspective view of the invention similar to FIG. 1 but illustrating another embodiment wherein the tile comprises and a top layer including a wear layer, a decorative layer and a polyvinyl chloride (PVC) layer, as well as a core layer, and further, showing the exposed portion formed with most of the top layer removed so as to be disposed into the PVC layer.
Figure 10:
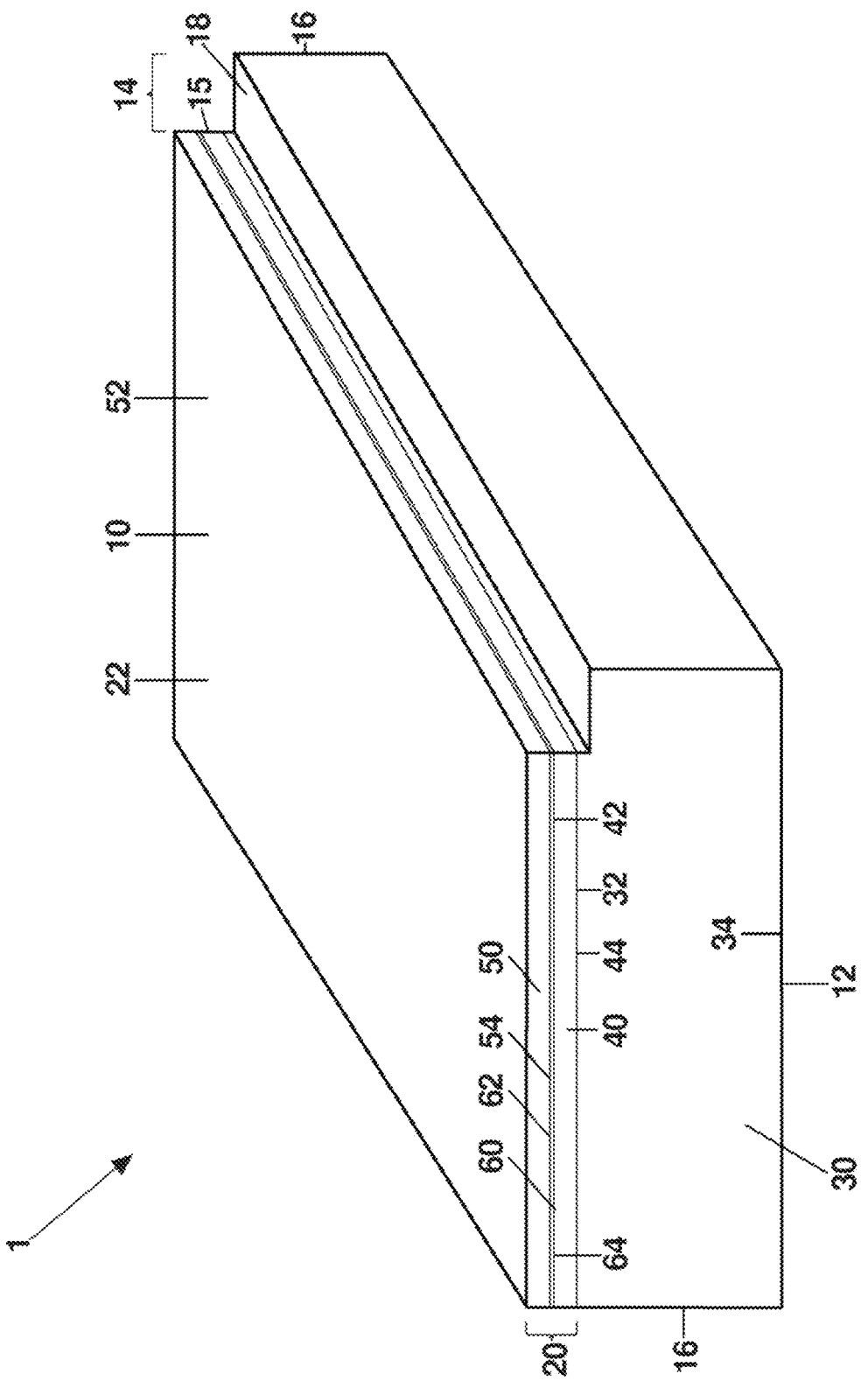
FIG. 10 is also a perspective view of the invention similar to FIG. 1 but illustrating the embodiment wherein the tile comprises a top layer including a wear layer, a decorative layer and a polyvinyl chloride (PVC) layer, and further, showing the exposed portion having an imitation grout line formed on the core layer.
Figure 11:
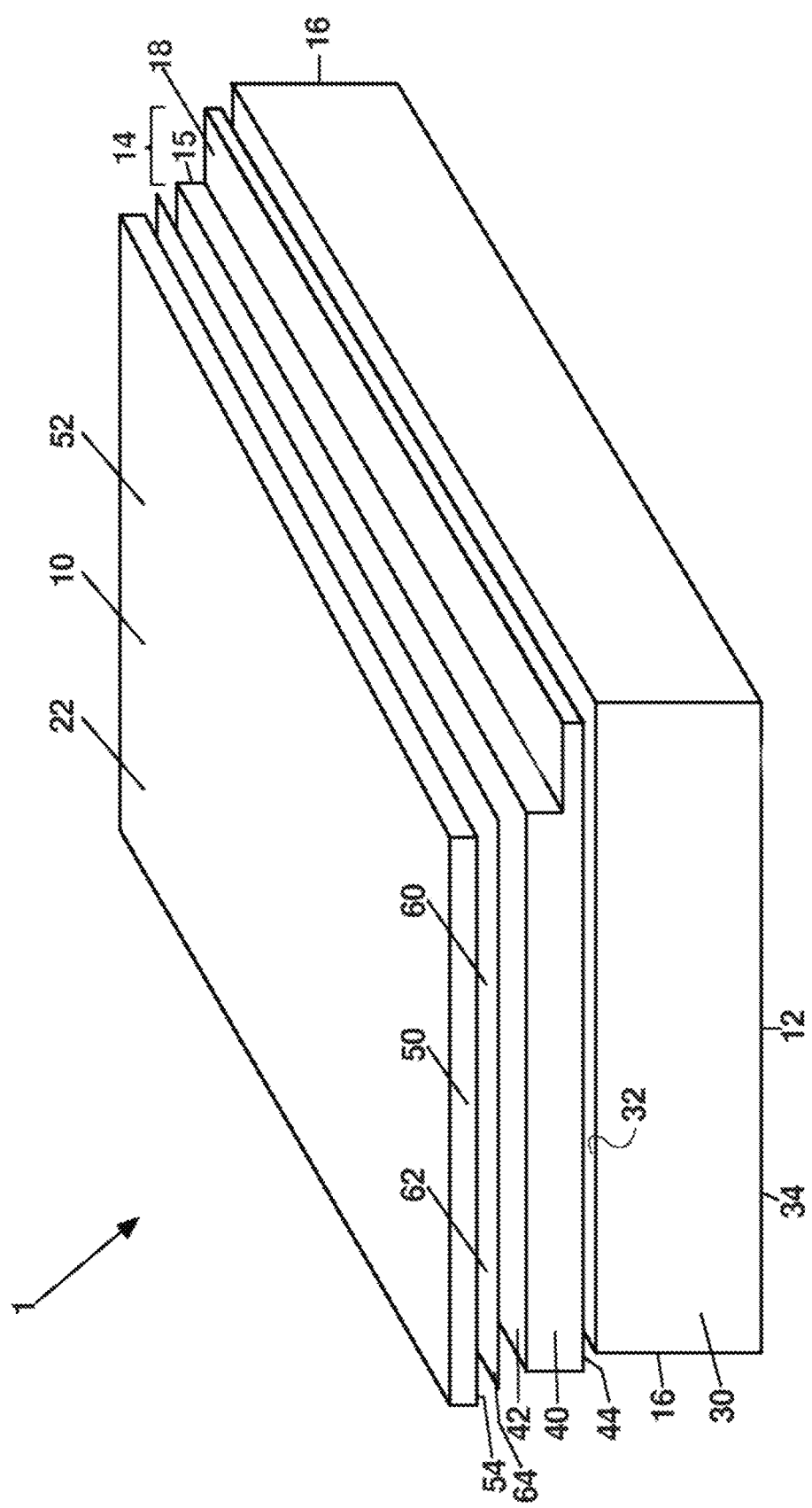
FIG. 11 is a perspective exploded view of the embodiment represented in FIG. 9.

With reference now to FIGS. 3, 5, 6, 7-A and 7-B, and FIGS. 9-11, the top layer 20 of the inventive tile 1 may comprise a wear layer 50, a polyvinyl chloride (PVC) layer 40 and also a decorative layer 60. The decorative layer 60 may comprise a film or sheet that may be made from a variety of materials such as, but not limited to, polyvinyl chloride (PVC). The decorative layer 60 will also preferably comprise one or more design features that help to provide an authentic look of a selected material, such as real stone, real marble, ceramic, wood, or another surface. For example, the decorative layer 60 may comprise a film having decorative features corresponding to the look and coloring of a natural wood grain or a wood flooring plank. In the embodiments of FIGS. 3, 5 through 7B, and 9-11, the decorative layer 60 is disposed in interconnecting relation between the wear layer 50 and the polyvinyl chloride (PVC) layer 40. These layers may be adhesively connected or interconnected by a variety of adhesives known in the art, such as but not limited to glue. For example, and as can be appreciated from FIGS. 9 and 11, the decorative layer 60 includes an upper surface 62 connected to the lower surface 54 of the wear layer 50, and also, a lower surface 64 connected to the upper surface 42 of the polyvinyl chloride (PVC) layer 40. Additionally, the wear layer 50 may be made so as to have a substantially translucent or transparent appearance. When the wear layer 50 is made of a translucent or transparent material, it permits the design features carried on the decorative layer 60 to be readily seen there-through. In one or more embodiments, a coating of another material may be applied to the top surface 10 of the wear layer 50. By way of example, this coating may comprise a ethoxyline resin (ER) or a polyurethane (PU) material, which may be cured using an ultra-violet (UV) lighting and heating process. It is within the scope of this invention, however, to provide a tile 1 with or without the decorative layer 60.

Additionally, it is within the scope of the present invention to provide a tile 1 that comprises waterproofing properties. As such, the materials of the different layers of the top layer 20 as well as of the core layer 20, may all comprise waterproofing properties. Similarly, adhesives used to connect these layers may also have waterproof properties.

As mentioned previously, the material composition of the top layer 20 may vary, but in at least one embodiment, the top layer 20 generally comprises a mixture of polyvinyl chloride (PVC), as well as calcium powder, oil, and a foaming agent. In one preferred embodiment, the material composition of the top layer 20 may be about 20% to about 30% polyvinyl chloride (PVC), about 60% to about 70% calcium power, about 5% to about 10% oil, and about 0.5% to about 5% foaming agent.

The tile 1 of the present invention also includes a lower or core portion, which may be defined by a core layer 30 as shown in FIGS. 1-14. The core layer 30 is preferably formed from a "densified foam" material. More specifically, the core layer 30 preferably comprises a densified foam material such as, but not limited to, a Wood Plastic Composite ("WPC") material, 1 and further, will preferably be waterproof. Additionally, the core layer 30 may have a smooth texture and may comprise one or more sublayers that serve as an underlayment or a sound barrier. These sublayers may be made of other materials such as laminate foil, cork, foam, or ethyl vinyl acetate. While the material composition of the core layer 30 may vary, it comprises in at least one embodiment a combination of a synthetic plastic polymer such as polyvinyl chloride (PVC), calcium powder, and a foaming agent. In a preferred embodiment, the densified foam material of core layer 30 comprises polyvinyl chloride (PVC) in an amount of generally between about 50% to about 55%, calcium powder in an amount of generally between about 40% to about 45%, and foaming agent in an amount of generally between about 5% to about 10%. The foaming agent may be a mixture of materials that enhance stability. Also in the preferred embodiments, the densified foam material of the core layer 30 will have a density within a range from about 800 kg/m$^3$ to about 900 kg/m$^3$ (and from about 49.942 lb/ft$^3$ to about 56.185 lb/ft$^3$ in English equivalent units) which aids in ensuring that the tile 1 is sufficiently rigid and durable for flooring applications.

In general, the overall thickness of the tile 1 may range from about 4 millimeters to about 12 millimeters, depending on the particular embodiment, which is from about 0.157 inches to about 0.472 inches in English equivalent units. In one or more embodiments of the tile 1, the overall thickness of the tile 1 from the top surface 10 of the top layer 20 to the bottom surface 34 of the core layer 30 will preferably be generally about 7 millimeters (about 0.276 inches), with the core layer 30 having a thickness in a range of generally between 4 millimeters to about 6 millimeters (about 0.157 inches to about 0.236 inches in English equivalent units). In embodiments of the tile 1 wherein the top layer 20 includes a wear layer 50 and a polyvinyl chloride (PVC) layer 40, the thickness of the top layer 20 will be generally about 2 millimeters. For example, the wear layer 50 between its top surface 52 and lower surface 54 may be in a range of between generally about 0.3 millimeters to 0.7 millimeters (which is about 0.012 inches to 0.028 inches in English equivalent units). Also, the thickness of the polyvinyl chloride (PVC) layer 40 between its top surface 42 and lower surface 44 may be in a range of between generally about 1.4 millimeters to about 1.5 millimeters (which is about 0.055 inches 0.059 inches). In embodiments of the tile 1 including a decorative layer 60, such as shown in FIGS. 3, 5 through 7-B, and 9-11, the thickness of the decorative layer 60 between its top surface 62 and bottom surface 64 may be in a range of generally about 0.05 millimeters (about 0.002 inches) to about 0.1 millimeters (about 0.004 inches). In a most preferred embodiment of the tile 1 according to the present invention, such as illustrated in FIG. 6, the core layer 30 comprises a thickness of about 5 millimeters (about 0.197 inches), with the top layer 20 comprising a thickness of generally about 2 millimeters (about 0.079 inches), including a wear layer 50 having a thickness of about 0.5 millimeters (about 0.02 inches), a polyvinyl chloride (PVC) layer 40 having a thickness of about 1.43 millimeters (about 0.056 inches), and a decorative layer 60 having a thickness of about 0.07 millimeters (about 0.003 inches). However, other embodiments of a tile 1 having a different thickness are also within the scope of the present invention, and as mentioned above, the thickness of the tile 1 may be in a preferred range from about 4 millimeters (about 0.157 inches) to about 12 millimeters (which is about 0.472 inches).

Figure 5:
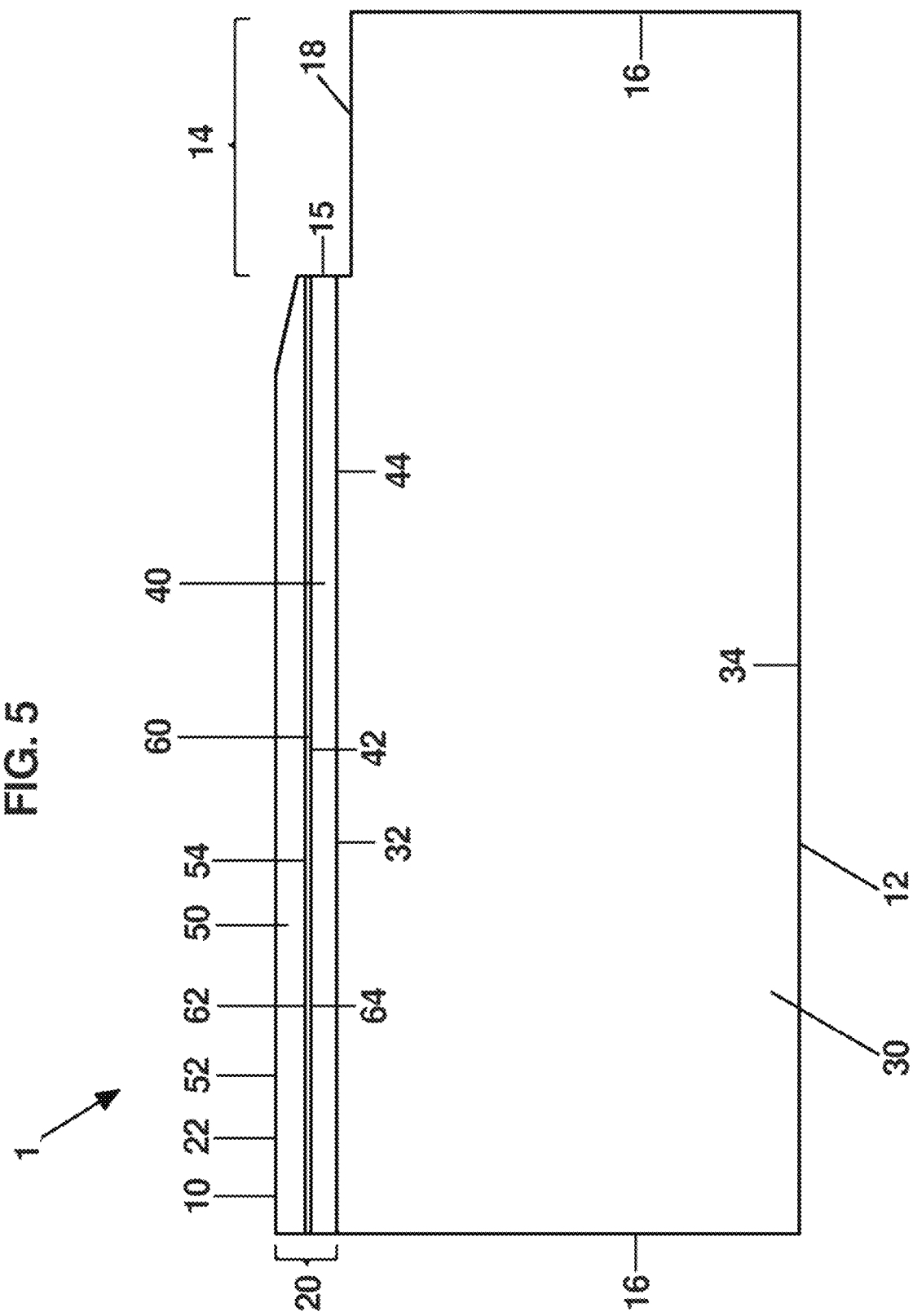
FIG. 5 is also a transverse sectional view of a tile in accordance with the present invention comprising a top layer and a core layer similar to FIG. 3, including the top layer having a polyvinyl chloride (PVC) layer, a decorative layer and a wear layer, but illustrating the exposed portion formed on the core layer.
Figure 6:
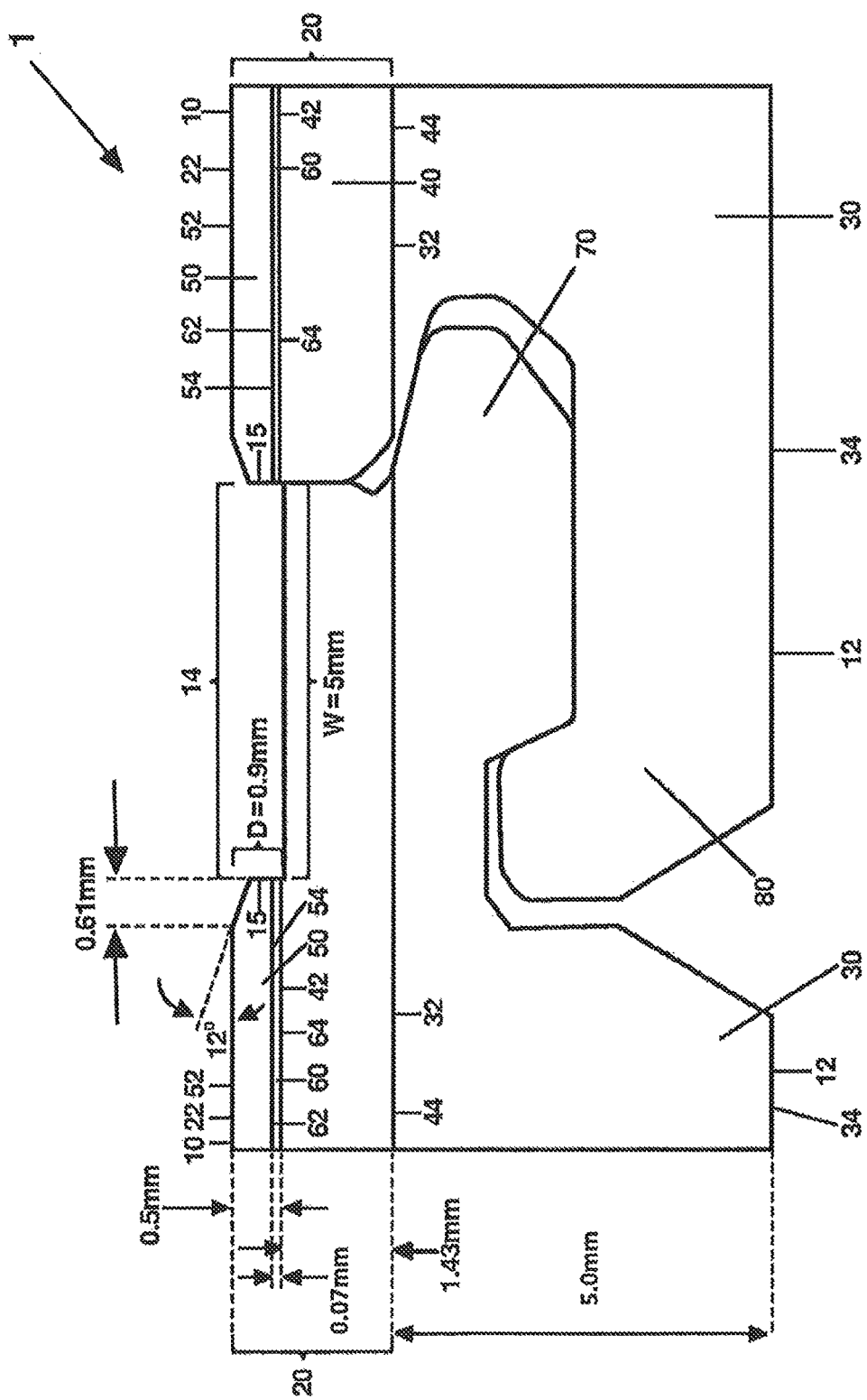
FIG. 6 is also a transverse sectional view of a tile according to the present invention, but illustrating a preferred embodiment of the top layer and exposed portion, as well as a core layer and an interconnecting mechanism.
Figure 7B:
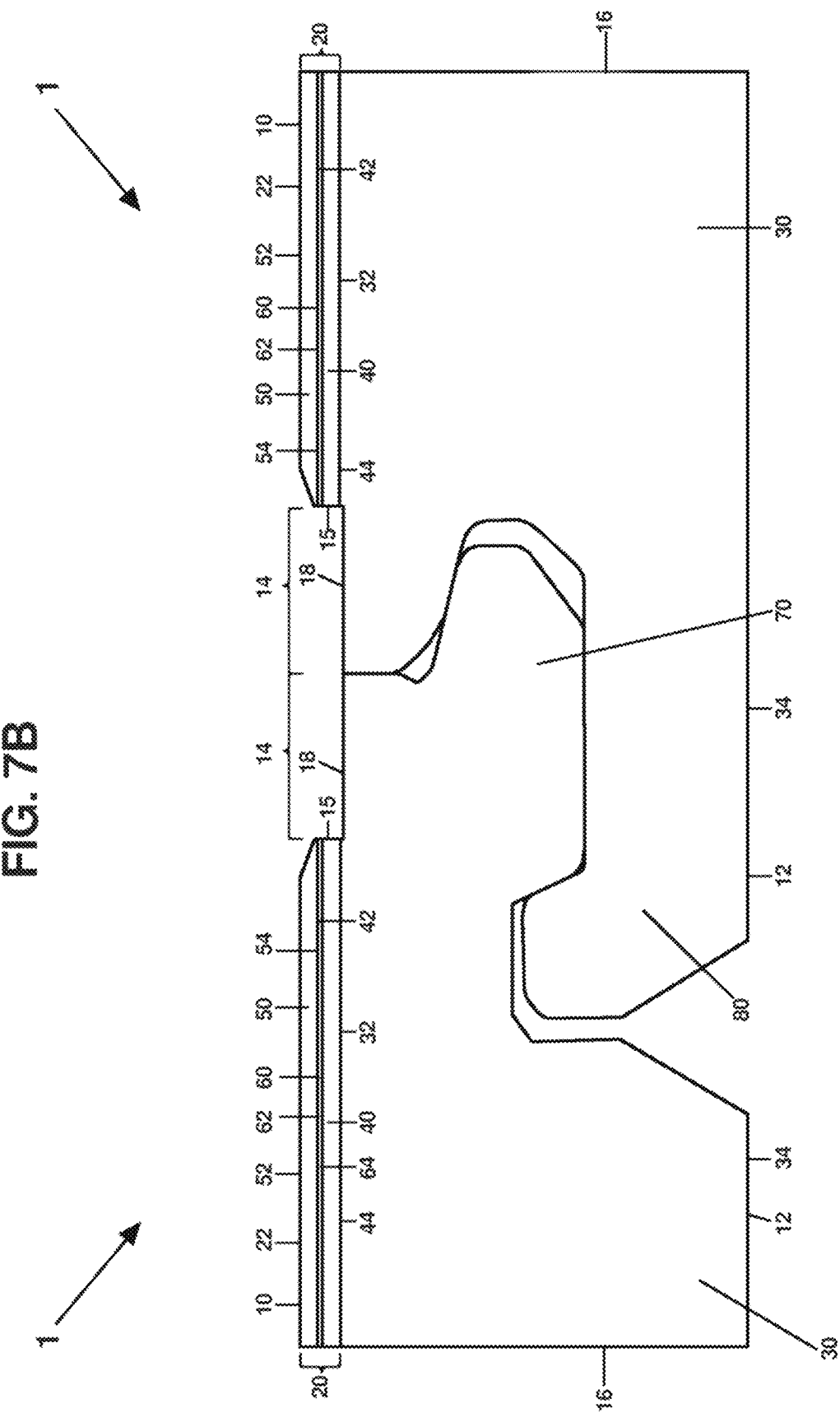
FIG. 7-A is also a transverse sectional view of a tile according to the present invention in another preferred embodiment comprising at least a top layer that includes a polyvinyl chloride (PVC) layer, and a core layer, and also an interconnecting mechanism, and illustrating an exposed portion having an imitation grout line formed in the PVC layer.

In an alternative embodiment, however, and as best shown in FIGS. 4-5, and 7-B, the inventive tile 1 may comprise a polyvinyl chloride layer 40 having a substantially reduced thickness between its top surface 42 and lower surface 44. For example, the thickness of the polyvinyl chloride (PVC) layer 40 may be approximately 0.3 millimeters (about 0.012 inches), which as described subsequently herein, may facilitate exposing at least a portion of the core layer 30 as the exposed portion 18 during the manufacturing process. In such embodiments, the overall thickness of the tile 1 will be generally about 5 millimeters (about 0.197 inches) to about 6.5 millimeters (about 0.256 inches), and preferably, approximately 5.9 millimeters (about 0.232 inches).

As noted above, the tile 1 of the present invention additionally comprises a plurality of sides, such as 16 or 16', and may also come in different shapes and in varying dimensions. For example, and as shown in the illustrative embodiments of FIGS. 8-11 and 15-A to 17-B, the tile 1 of the present invention may have a substantially rectangular shape with four sides 16 or 16'. The dimensions of such a tile 1 having a rectangular shape may be, by example only, twelve (12") inches by twenty-four (24") inches, but can readily be varied to other appealing dimensions. As another example, the tile 1 of the present invention might have a square shape. Moreover, the tile 1 of the present invention might also have six or eight sides 16 or 16' as is the case with tiles having hexagonal or octagonal shapes. Other shapes, including those comprising an uneven number of sides, are also possible depending on the overall desired visual effect.

The tile 1 of the present invention also includes along at least one of its sides, such as 16, an exposed portion 18. As illustrated in FIGS. 1-14, this exposed portion 18 extends outwardly below and away from the top surface 10 of the tile 1, and is defined in part by a sidewall 15 formed within at least said top layer 20. As will be described subsequently herein, the exposed portion 18 effectively defines a gap 14 in the plane of the top surface 10 of the tile 1 that, as perhaps best shown in FIGS. 8-14, preferably extends uniformly and either completely or substantially along the length of the side 16. In at least one embodiment, such as is illustrated in FIG. 6, this exposed portion 18 is configured to be located at a depth of generally about 0.9 millimeters (about 0.035 inches) from a top surface 10 of the tile, or in a range from about 0.9 millimeters (about 0.035 inches) up to about 2 millimeters (about 0.079 inches) from the top surface 10 of the tile 1. This exposed portion 18 also includes a textured surface structured to closely represent the look and feel of an actual grout line. As will also be described subsequently herein with reference to FIGS. 15-A through 17-B, when a plurality of the inventive tiles 1 are assembled and installed with their exposed portions 18 disposed in an operative orientation, they will collectively offer to a person standing a few feet away (or more) a highly realistic appearance both in terms of the tile's similarity itself to a selected material such as real marble, stone, or ceramic, but importantly, also 1 in terms of the tiles 1 having the appearance of an actual grout line caused in large part by the depth of the exposed portion 18 and the width of the gap 14 relative to the top surface 10 of the tile 1, as well as the textured surface of the exposed portion 18. Moreover, the top layer 20 and/or core layer 30 may be manufactured to include a dye that may match or be representative a variety of grout colors so as to correspond with the intended coloring of the overall tile 1.

As is also shown in FIGS. 1-14, the exposed portion 18 of the tile 1, including the sidewall 15 associated therewith, can be seen to effectively define a gap 14. The width W of the exposed portion 18, and the gap 14 created thereby, will in the preferred embodiments be substantially uniform along a length of the side 14 of the tile, and may range from being nearly imperceptible, but still visible, to a width W of about 6 millimeters (about 0.236 inches), or more, depending on the desired look of the overall surface. The preferred embodiment of FIG. 6, however, illustrates an exposed portion 18 having a width W of approximately 5 millimeters (about 0.197 inches). Additionally, the embodiment of FIG. 6 illustrates a sidewall 15 that extends into the polyvinyl chloride (PVC) layer 40 of the top layer 20, so that the exposed portion 18 is formed on or within the PVC layer 40 at a depth D of generally about 0.9 millimeters (about 0.035 inches) below the top surface 10 of the tile 1. However, the exposed portion 18 may be located at another depth, but preferably within a range of between generally about 0.9 millimeters (about 0.035 inches) to about 2 millimeters (about 0.079 inches) from the top surface 10 of the tile 1. This range should 1 be considered an approximation as during the production of the tile(s) 1, variations, such as within 0.1 millimeters (about 0.004 inches), are likely, which may enhance the realistic appearance of the imitation grout line of the tile(s) 1.

The aforesaid exposed portion 18 having a textured surface structured to represent the look and feel of an actual grout line is ideally achieved during the manufacturing process for the inventive tile 1. More specifically, in the process of manufacturing the tile 1, a tool such as a press and/or router or another instrument, such a cutting blade(s), a profiling knife, etc. may be applied to the tile 1, such as to the top layer 20, along at least one side or edge 16. The press and/or router or other tool may be used to remove all or substantially all of the top layer 20 extending along a selected side 16 of the tile 1, so as to expose a portion of the polyvinyl chloride (PVC) layer 40 and define the exposed portion 18 in outwardly extending relation to a selected side, such as 16, of the tile 1. In the preferred embodiments, the density of the polyvinyl chloride (PVC) layer 40 should be between generally about 2,000 kg/m$^3$ (which is about 124.856 lb/ft$^3$) to about 2,400 kg/m$^3$ (which is about 149.827 lb/ft$^3$), in order to permit the tool, cutting blade(s), knife or other instrument to cut into and profile the polyvinyl chloride (PVC) layer 40 to form the sidewall 15 and exposed portion 18, and to create a texture surface thereon that ideally approximates that of fine sand. Additionally, this density range provides sufficient structural integrity to the polyvinyl chloride 1 (PVC) layer 40 so that it does not disintegrate, rupture, tear or otherwise incur damage during the cutting and profiling process. In an alternative embodiment, during the process of manufacturing the tile 1, the tool or instrument used may remove more of the top layer 20 extending along a selected side 16 of the tile, so as to expose a deeper profile into at least a portion of the core layer 30 as well.

Also, in the preferred embodiments of the tile 1 as shown in FIGS. 2-3, 6, 9, and 11-14, the exposed portion 18 is formed on the polyvinyl chloride (PVC) layer 40. As will become clear from the discussion below, during the manufacturing process, when a portion of the top surface 10 of the tile 1 is removed along one side, such as 16 thereof, preferably at a depth of between 0.9 millimeters (about 0.035 inches) to 2 millimeters (about 0.079 inches) below the plane of top surface 10, at least a portion of the polyvinyl chloride (PVC) layer 40 will be exposed and formed to define the exposed portion 18, including a sidewall 15 and a gap 14. Alternatively, and as has been described relative to FIGS. 4, 5 and 7-B, the thickness of the polyvinyl chloride (PVC) layer 40 may be substantially reduced so as to facilitate exposing at least a portion of the core layer 30 to define the exposed portion 18 and gap 14 thereon.

In another embodiment of the inventive tile 1, the top layer may comprise yet a further additional layer for reasons which will now be described. More specifically, and in those embodiments wherein the top layer 20 includes a polyvinyl chloride 1 (PVC) layer 40 having a dye or colorant(s) and a decorative layer 60, an additional layer, which may be in the form of a coating, may be connected to and disposed between the polyvinyl chloride (PVC) layer 40 and the decorative layer 60. This additional layer may comprise a thin layer of raw polyvinyl chloride (PVC) material which is typically black in color, but in at least one other embodiment this additional layer may comprise a coating of material having a tonality that approximates a black color. The need in some embodiments for an additional layer arises because the decorative layer 60 is generally designed to be used with or against a dark background such that it can adequately reflect the desired tones of a selected color and/or overall designs appearing on the decorative layer 60. Therefore, some embodiments of the inventive tile 1 may comprise yet an additional layer of PVC or a black coating applied to the polyvinyl chloride (PVC) layer 40 to serve as a dark background for the decorative layer 60, which preferably has a tonality that approximates a black color or other dark background colors such as, but not limited to dark brown or dark grey. Also, the need for some embodiments of the tile 1 to include this additional layer or coating arises because during the formation of the polyvinyl chloride layer 40, when the raw polyvinyl chloride (PVC) is mixed with a dye or colorant(s), higher concentrations of the dye or colorant may accumulate towards the bottom and top surfaces of the PVC layer 40. Accordingly, to help ensure that the color of the imitation grout line 1 being formed on the tile 1 on or as part of the polyvinyl chloride (PVC) layer 40 is substantially uniform, in the preferred embodiments no more than approximately 0.4 millimeters (about 0.016 inches) of material should be removed from the polyvinyl chloride (PVC) layer 40 itself, so as to create the exposed surface 18 at a desirable depth within the PVC layer where the dye or colorant(s) tend to accumulate. In at least one preferred embodiment, the depth of the material removed to create the exposed surface 18 in the PVC layer 40 will be less and generally only about 0.33 millimeters (about 0.013 inches) of material should be removed. In other words, because the dye or colorant(s) tend to accumulate at the upper and lower surfaces of the PVC layer 40, an optimal depth in some embodiments at which the exposed portion 18 will be disposed or located will be generally between approximately 0.33 millimeters (about 0.013 inches) to approximately 0.4 millimeters (about 0.016 inches) below the top or fifth surface 52 of the polyvinyl chloride (PVC) layer 40. This ensures that the exposed portion(s) 18 is formed on sections of the polyvinyl chloride (PVC) layer 40 that comprise an adequate or otherwise sufficient amount of dye or colorant.

With reference now to FIGS. 6, 7-A and 7-B, the inventive tile 1 may additionally comprise an interconnecting mechanism formed on the sides 16 or 16' of the tile 1. For example, the interconnecting mechanism of the present invention may comprise a "tongue" side 70 formed on or along one side 16 of the tile 1, and a "groove" side 80 formed on or along a different side 16' of a different tile 1. The "tongue" side 70 and the "groove" side 80 are configured so as to be joined together in mating engagement and facilitate both the installation and alignment of the tiles 1 during installation. Additionally, either the "tongue" side 70 and/or the "groove" side 80 may be formed on the tile 1 primarily as part of the core layer 30 as shown in FIGS. 6-7-B. The "tongue" side 70 and the "groove" side 80 may also be structured so as to permit slight movement and/or rotation between two adjacent tiles, which permits adjustment of one tile relative to another to accommodate uneven substrates, or a slab of concrete that is not perfectly level, as is often the case with unfinished floors and/or walls. As such, either the "tongue" side 70 or the "groove" side 80 may be formed at least partially within the top layer 20 as shown in FIGS. 6-7-A.

With reference now to FIG. 6, in a preferred embodiment the inventive tile 1 will have an exposed portion 18 formed on a side 16 thereof which corresponds to the "tongue" side 70 only, and not to the "groove" side 80. In the embodiment of FIG. 6, the gap 14 defined by exposed portion 18 and sidewall 15 is also partially defined by the top layer 20 and edge 16' of an adjacent tile 1 which includes the "groove" side 80. Alternatively, as is shown in the embodiments of FIGS. 7-A and 7-B, the "tongue" side 70 and the "groove" side 80 of the tile 1 may each be configured to include an exposed portion 18 having the textured surface that imitates the grout line. Other embodiments are also within the scope of the present invention wherein the exposed portion 18 may be formed on a tile 1 with a "groove" side 80, and not on the "tongue" side 70. Moreover, the tile 1 of the present invention may be cooperatively configured with different mechanical joining systems made by a variety of manufacturers. These mechanical joining systems may include a relatively new "click-lock" type of mechanical joining system used during installation of a variety of surfaces such as imitation flooring tiles.

The production process for the inventive tile 1 can vary, but generally comprises different production sequences. For example, the core layer 30 may be produced by mixing together the raw materials, such as a PVC material, calcium powder and foaming agent, and any accessory materials, and applying heat to melt the mixture. The melted materials may be then placed into an extrusion machine that molds the melted material into boards. At this stage, foaming material may be added to facilitate production and thereafter, a resting or curing stage for roughly 24 to 36 hours. The production process for the top layer 20 also comprises mixing together the raw materials, such as a PVC material, calcium powder, oil and a foaming agent, and any accessory materials, and applying heat to the mixture to melt it. Then the melted materials may be pressed over one or more pressing stages to form vinyl pieces, which at this point, are likely to include a textured surface. Thereafter, the vinyl pieces, which essentially form the top layer 20, may be pressed with a decorative layer 60, such as a thin film sheet of polyvinyl chloride (PVC). An ultra-violet (UV) coating may later be added to the top surface 10 or alternatively, another coating is applied followed by further processing using ultra-violet light and heat.

After production of the top layer 20 and the core layer 30, individual sheets of both may be adhesively joined or glued together to form the desired tile(s) 1 as shown for example, in FIGS. 8-11. After application of the glue or other adhesive(s), the assembled layers are pressed, for example, by a cold pressure machine in a thermostatic chamber for about 6 hours to about 8 hours. After pressing, the assembled layers may be left in the thermostatic chamber for about 36 hours to about 48 hours to rest or cure. Thereafter, the assembled layers or master-boards may be cut into smaller sizes. The master-boards generally have a dimension of about 2 meters to about 3 meters, but may have different dimensions. After the assembled layers or master-boards are cut into smaller sizes, each individual piece may be passed through a machine that gives one or more sides 16 or 16' of a tile an individual profile. This profile may include forming modifying, roughening or otherwise cutting the sides 16 or 16' of the assembled tiles 1. At this stage, either or both of the exposed surface 18, having the imitation grout line, or the interconnecting mechanism may be formed. Thereafter, the tile(s) 1 may be packaged for shipment.

As previously mentioned, the tile 1 of the present invention can be configured to imitate the feel or texture of a real material such as real stone, marble, ceramic, wood, or another material. Accordingly, during the pressing stage a customized texture may be given to the wear layer 50 of the tiles 1. A computer may be used to configure a press according to a decorative design, such as a visual design of the decorative layer 60, so that the press gives the wear layer 50 a corresponding texture. More specifically, a picture of the intended decorative design may be inputted into a computer so as to program the press accordingly.

Figure 15B:
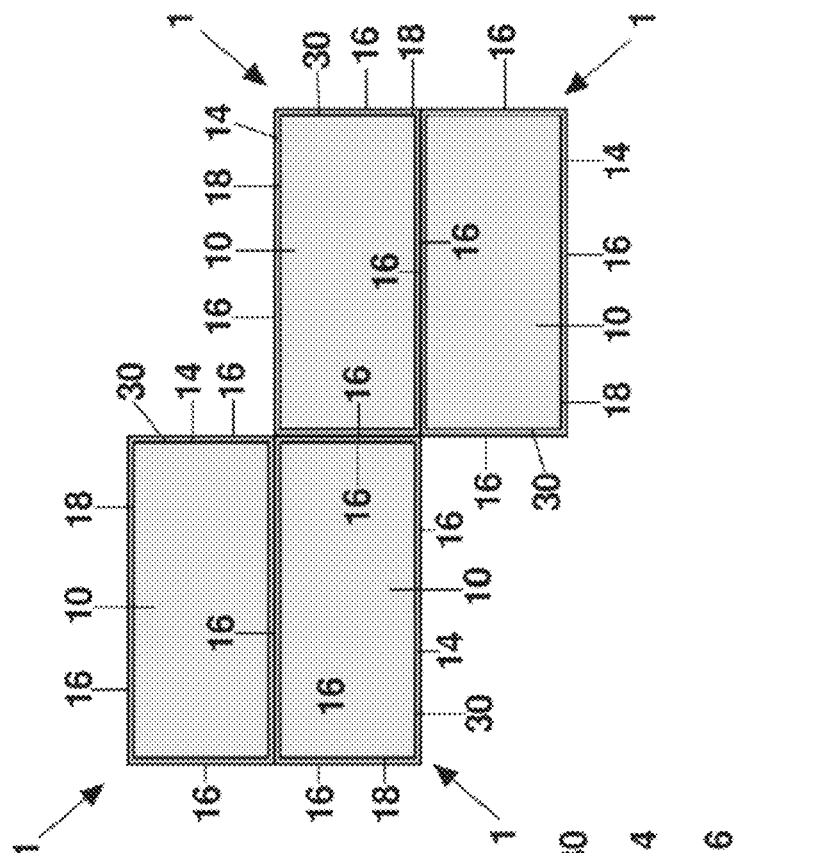
FIG. 15-A is a plan view of one preferred embodiment according to the present invention showing a tile comprising an exposed surface with an imitation grout line formed on all of its sides.
Figure 15A:
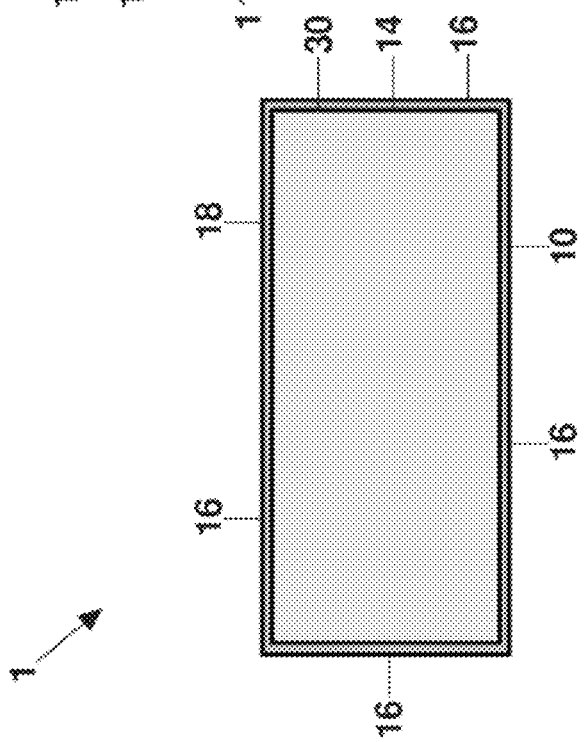

For use as a flooring application, a plurality of the inventive tiles 1 will be disposed next to each other in an operative orientation. As such, a side of one tile 1 will be disposed next to the side of a different tile 1. As mentioned previously, the exposed portion 18 of the inventive tile 1, and the gap 14 defined thereby, may have varying dimensions. Also, and with reference now to FIG. 15-A, in one embodiment of the tile 1 having a rectangular configuration, each of the four sides 16 may have an exposed portion 18 and a textured surface formed thereon. In such an embodiment, the exposed portion 18 and textured surface formed on each side 16 may be sized to equal generally one half (½) of the overall, intended resulting size of the imitation grout line formed between tiles, as illustrated in FIG. 15-B. For example, the width of the exposed portion 18 and textured surface may be generally about 2.5 millimeters to about 3 millimeters. As such, an entire simulated grout line comprising the exposed portion 18 and texture surface thereon may be formed between two adjacent tiles and have a width of generally about or between 5 millimeters and 6 millimeters.

In an alternative embodiment, and with reference now to FIGS. 16-A and 17-A, an inventive tile 1 may have an exposed portion 18 and textured surface formed on only two sides 16 thereof, each of which is sized to equal generally all or substantially all of the grout line formed between tiles. That is, and as shown in FIGS. 16-A and 17-A, a tile 1 may have two sides 16 that each include an exposed portion 18 and a textured surface formed thereon, and two sides 16' that do not. For example, and as is perhaps best shown in FIG. 16-B, each side(s) 16 of the tile 1 having an exposed portion 18 may be disposed next to a side 16' of a tile 1 that does not have such structure. In this embodiment, the exposed portion 18 and textured surface may be sized to have a width of generally about or between 5 millimeters (about 0.197 inches) to 6 millimeters (about 0.236 inches). When two or more of such tiles 1 shown in FIG. 16-A or 17-A are disposed next to each other, as shown in FIGS. 16-B and 17-B respectively, the visual effect that results is a full imitation grout line formed around all sides of each tile. However, other combinations of the size and location of the exposed portion 18 are also possible. For example, in one or more embodiments, the exposed portion 18 may also be formed on the tile 1 and within the top surface 10 but at a middle or central section thereof, instead of on (or in addition to) one or more of its side(s) 16. In such embodiments, the exposed portion 18 be disposed 1 within a middle or central section of the tile 1 and extend across or substantially across the top surface 10 thereof between opposite side(s) 16 of the tile 1. Such an alternative embodiment of the tile 1 may be useful in order to offer a wider selection of possible tile arrangements during installation. For example, and as has been described, the inventive tile (1) can be offered in a rectangular shape of 12"×24" and typically, such tiles will be installed in an off-set or staggered arrangement, so that the corners of one tile will not be disposed immediately adjacent to or in alignment with the corners of another tile. With the alternative embodiment, however, even with the rectangular tiles 1 installed in an off-set or staggered arrangement, the same tiles can offer an appearance of being square in shape, as the exposed portion 18 extending along one side 16 of a first tile, can be installed so as to be in alignment with an exposed surface 18 extending across the middle or central section of another immediately adjacent tile.

Figure 12:
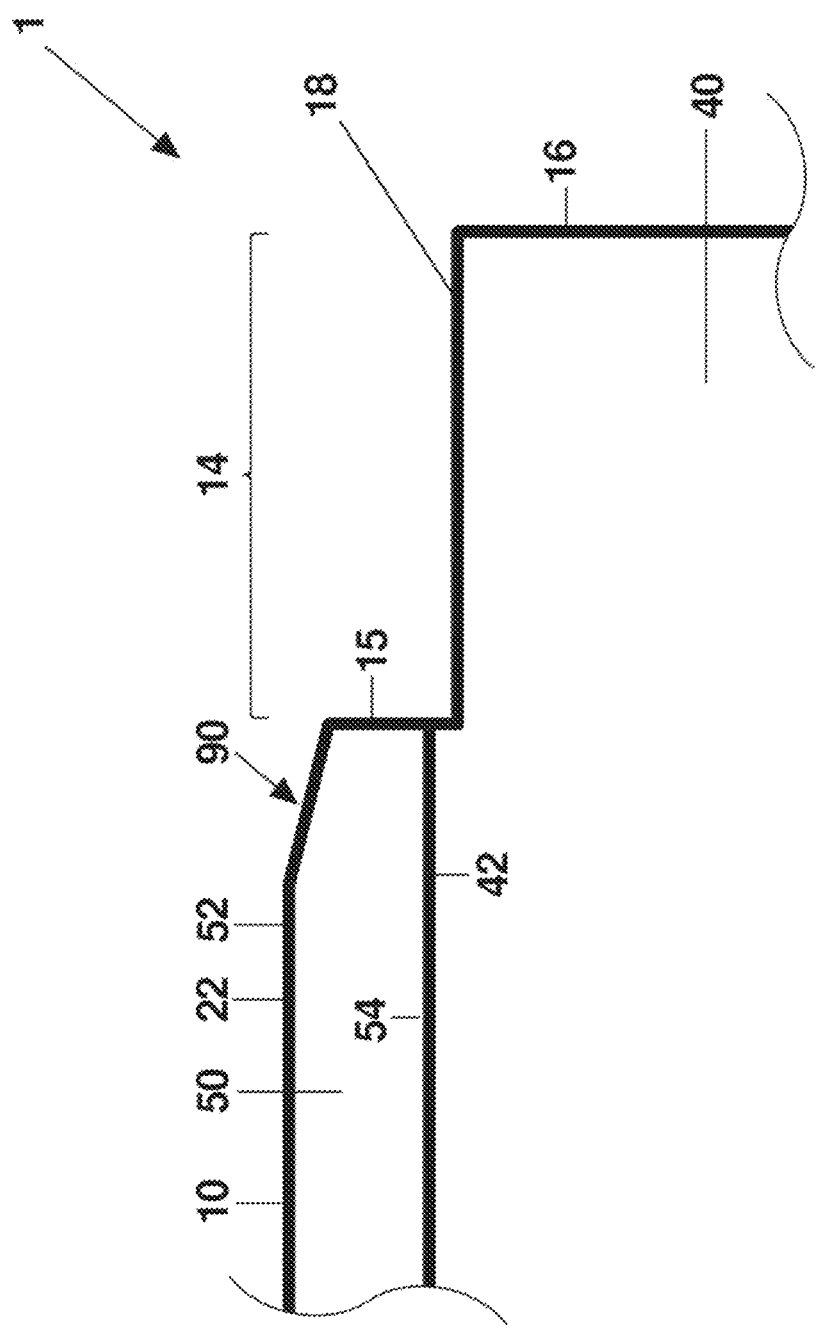
FIG. 12 is a transverse sectional view of one embodiment according to the present invention having a bevel formed on the top layer.
Figure 13:
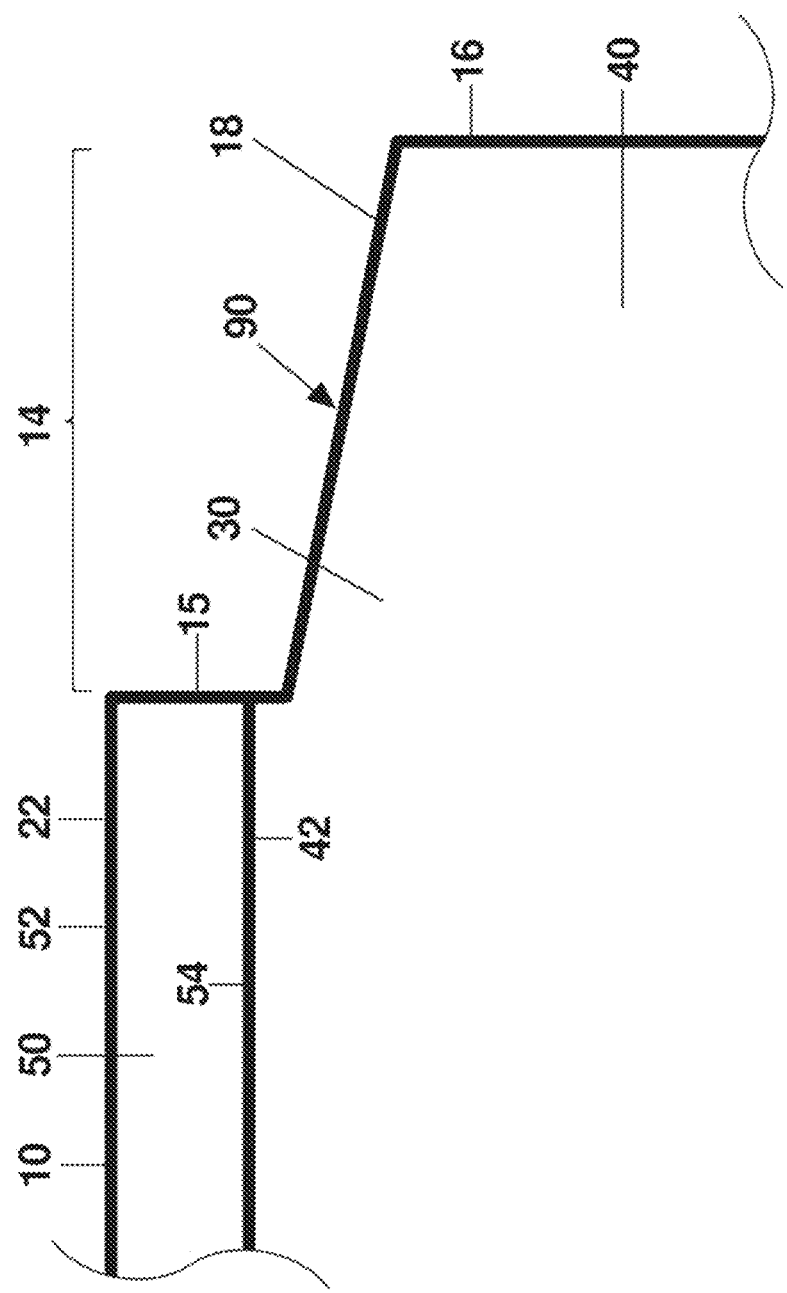
FIG. 13 is a transverse sectional view of an alternative embodiment according to the present invention having a bevel formed on the core layer.
Figure 14:
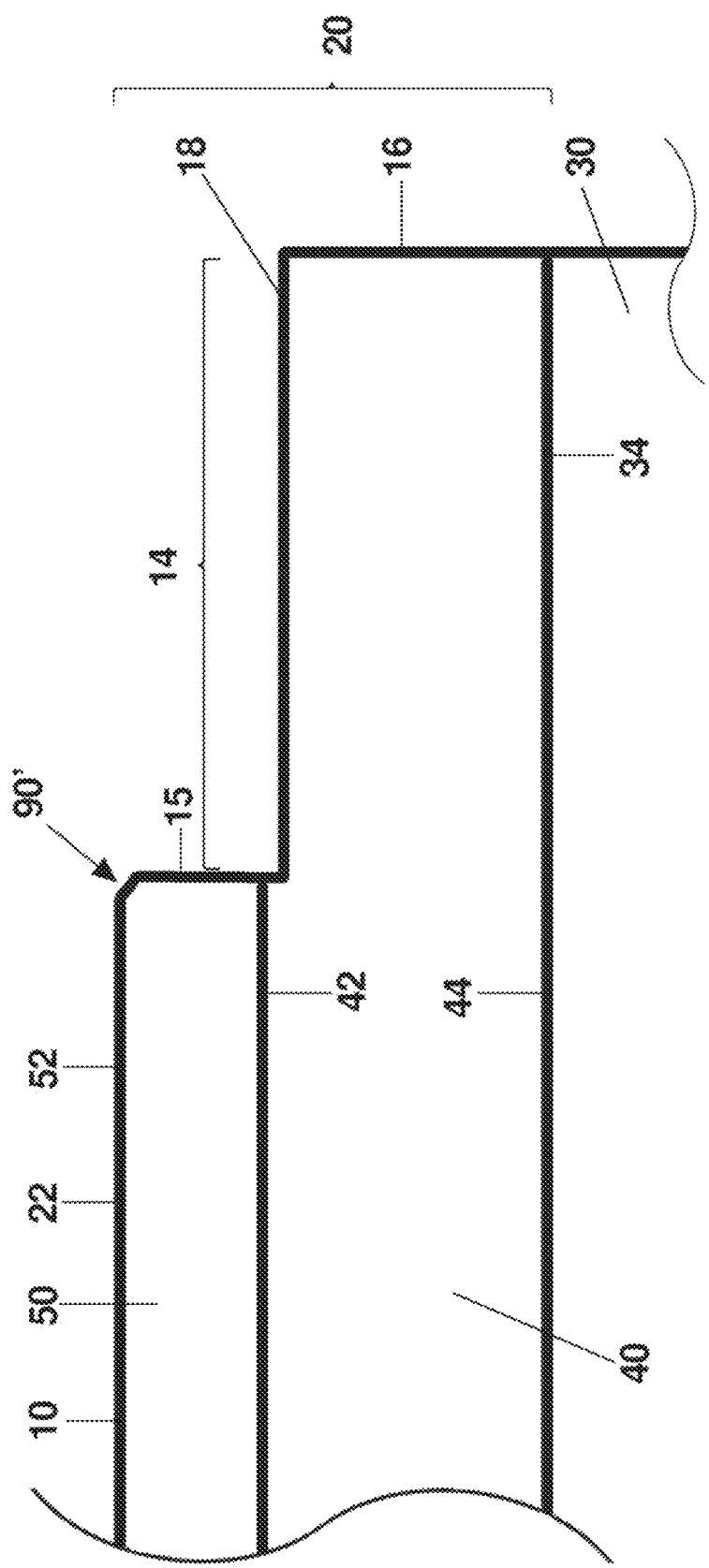
FIG. 14 is a transverse section view of yet another embodiment according to the present invention having a micro bevel formed on a top layer.

With reference now to FIGS. 12-14, the tile 1 of the present invention may also comprise a bevel 90 formed on one or more side(s) 16 of the tile 1 adjacent to the exposed portion 18 and gap 14. The bevel 90 may be formed on the sidewall 15 associated with the exposed portion 18, at an upper portion thereof so as to be formed on the top layer 20, and specifically on the wear layer 50. The bevel 90 comprises a slanted portion that slopes downwardly, away from the top surface 10 of the tile 1 and towards the sidewall 15 that at least partially defining the exposed portion 18. Preferably, the bevel 90 is formed to extend uniformly and coincident with sidewall 15, exposed portion 18 and gap 14 along all or substantially all of one the side(s) 16 of the tile 1. Additionally, the bevel 90 may comprise a variety of sizes and angles of inclination with respect to the top surface 22 of the tile 1. For example, the bevel may have an angle of inclination that can range from generally about thirty degrees (30°) to about ninety degrees (90°). The illustrative embodiment of FIG. 12 shows a bevel 90 having an angle of inclination of generally thirty degrees (30°). In an alternative embodiment shown in FIG. 13, the bevel 90 may instead comprise a two stage descent from the top surface 10 to the sidewall 15 defining exposed portion 18 and gap 14 of the tile 1. With reference to FIG. 14, the bevel 90 may alternatively comprise a "micro" bevel 90'. As another example, and as shown in FIG. 13, the bevel 90 may additionally be formed on the exposed portion 18 itself, and may correspond with either the core layer 30 and/or the polyvinyl chloride (PVC) 40 layer instead of the top layer 20. In such cases, the bevel 90 may have a slanted portion with an angle of inclination of generally about ten degrees (10°).

Yet additional features of the tile 1 of the present invention can include the core layer 30 being comprised of a material different from those used in vinyl composite tiles (VCT), such as material(s) used in stone plastic composite (SPC), also sometimes referred to as "rigid board." Stone plastic composite (SPC) is generally a mixture of materials that includes densified foam polyvinyl chloride (PVC) and stone dust, or an equivalent material, and will typically be about two times the weight (or more) of the core layer 30 described previously herein as a densified foam of Wood Plastic Composite ("WPC") material. Accordingly, in some embodiments, the core layer 30 of the present inventive tile 1 may comprise stone plastic composite (SPC) structured to provide sufficient support for the top layer 20 and inventive tile 1, so that the tile is suitable for flooring applications. In embodiments where the core layer 30 comprises a stone plastic composite (SPC) material, then the top layer 20 may be manufactured without a polyvinyl chloride (PVC) layer 40. Such alternative embodiments using SPC material as the core layer 30 may provide an advantage because SPC material has properties that make it resistant to expansion and/or contraction. The expansion coefficient of stone plastic composite (SPC) is higher than that of other materials used in flooring applications, and therefore, stone plastic composite (SPC) is a material reduces the possibility that the overall tile 1 will flex, bend, or otherwise expand in ambient conditions. Using a stone plastic composite (SPC) material may also result in reduced or no dimensional shifting that might otherwise occur between individual tile(s) 1 after installation. Embodiments of the tile(s) 1 of the present invention comprising a core layer 30 having a stone plastic composite (SPC) material may have a thickness of about 5 millimeters, but preferably, the thickness of the core layer 30 will be reduced to approximately 4 millimeters.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A tile comprising:
   a top layer at least partially defining a top surface of the tile, said top layer including a polyvinyl chloride (PVC) layer having a first density;
   a rigid core layer connected to said top layer, said core layer comprising a densified foam material, said rigid core having a second density and a thickness within a range of about 4 millimeters to about 6 millimeters (about 0.157 inches to about 0.236 inches);
   a plurality of sides with at least one exposed portion extending outwardly from and along a length of one of said plurality of sides, and a bevel is located on a sidewall associated with said exposed portion and extending along said at least one of said plurality of sides;
   an interconnecting mechanism, said interconnecting mechanism formed substantially along at least one of said plurality of sides and so as to correspond to said at least one exposed portion;
   said at least one exposed portion formed on at least a portion of said polyvinyl chloride (PVC) layer and further comprising a textured surface structured to represent a grout line;
   said at least one exposed portion being defined at a depth below said top surface within a range between about 0.9 millimeters to about 2 millimeters (about 0.035 inches to about 0.079 inches); and
   wherein said first density of said polyvinyl chloride (PVC) layer is greater than said second density of said rigid core layer.

2. The tile as recited in claim 1 wherein said polyvinyl chloride (PVC) layer further includes a colorant so as to correspond with an intended visual appearance of said grout line.

3. The tile as recited in claim 1 wherein said first density of said polyvinyl chloride (PVC) layer is in a range from between about 2,000 kg/m$^3$ to about 2,400 kg/m$^3$ (about 124.856 lb/ft$^3$ to about 149.827 lb/ft$^3$).

4. The tile as recited in claim 1 further comprising at least one additional exposed portion formed on said top surface and at a middle section thereof, and further, wherein said additional exposed portion is formed within said polyvinyl chloride (PVC) layer and extending substantially across said middle section between opposite sides of tile.

5. The tile as recited in claim 1 wherein said bevel comprises an angle of inclination of about 12 degrees to about 30 degrees relative to said top surface of the tile.

6. The tile as recited in claim 1 further comprising a plurality of exposed portions each disposed in outwardly extending relation to a different, correspondingly disposed one of said plurality of sides; each of said plurality of exposed portions including a textured surface structured to represent a grout line.

7. The tile as recited in claim 6 wherein said plurality of exposed portions extend outwardly from and substantially along at least two different adjacent ones of said plurality of sides.

8. The tile as recited in claim 6 wherein said plurality of exposed portions extend outwardly from and substantially along at least two different opposite ones of said plurality of sides.

9. The tile as recited in claim 1 wherein said at least one exposed portion comprising said textured surface is disposed substantially along at least one of said plurality of sides.

10. The tile as recited in claim 9 wherein said exposed portion is defined within said polyvinyl chloride (PVC) layer and so as to be at a substantially uniform depth below said top surface.

11. The tile as recited in claim 10 wherein a width of said at least one exposed portion is substantially uniform and sized to be within a range of between about 1 millimeter to about 6 millimeters (about 0.039 inches to about 0.236 inches).

12. The tile as recited in claim 1 wherein said top layer further comprises a wear layer interconnected to said polyvinyl chloride (PVC) layer.

13. The tile as recited in claim 12 wherein said top layer further comprises a decorative layer disposed between said wear layer and said polyvinyl chloride (PVC) layer.

14. The tile as recited in claim 13 wherein said wear layer comprises a substantially transparent material, such that said decorative layer is visually observable through said wear layer.

15. A tile comprising:
   a top layer comprising at least a wear layer and a polyvinyl chloride (PVC) layer; said wear layer at least partially defining a top surface of the tile; said polyvinyl chloride (PVC) layer comprising a first density;

a core layer comprising a densified foam material connected to said top layer, said core layer comprising a second density between about 800 kg/m$^3$ to about 900 kg/m$^3$ (about 49.942 lb/ft$^3$ to about 56.185 lb/ft$^3$), said core layer comprising a thickness within a range of about 4 millimeters to about 6 millimeters (about 0.157 inches to about 0.236 inches);

a plurality of sides with an exposed portion formed outwardly from and substantially along a length of one of said plurality of sides, said exposed portion defined in part by a sidewall formed within said top layer and extending into at least said PVC layer at a depth of at least 0.9 millimeters (at least 0.035 inches) below said top surface of the tile;

said exposed portion having a textured surface structured to represent a grout line;

an interconnecting mechanism formed substantially along at least one of said plurality of sides and corresponding to said exposed portion;

said first density of said polyvinyl chloride (PVC) layer being greater than said second density of said core layer; and said exposed portion having a width in a range of about 2 millimeters to about 5 millimeters (about 0.079 inches to about 0.197 inches) and including the textured surface to simulate the grout line.

16. The tile as recited in claim 15 wherein said exposed portion is further defined by said sidewall extending through said top layer at a depth of about 2 millimeters (about 0.079 inches) so as to expose a portion of said core layer.

17. The tile as recited in claim 16 wherein said core layer further comprises a colorant selected to correspond to a desired visual appearance of the tile and of said exposed portion having said textured surface that simulates the grout line.

18. A tile comprising:
(a) a top layer comprising at least a wear layer, a polyvinyl chloride (PVC) layer and a decorative layer;
  (i) said wear layer at least partially defining a top surface of the tile;
  (ii) said polyvinyl chloride (PVC) layer having a first density between about 2,000 kg/m$^3$ to about 2,400 kg/m$^3$ (between about 124.856 lb/ft$^3$ to about 149.827 lb/ft$^3$);
  (iii) said decorative layer disposed between said wear layer and said polyvinyl chloride (PVC) layer, with said wear layer comprising a substantially transparent material such that said decorative layer is visually observable through said wear layer,
(b) a rigid core layer adhesively joined to said top layer and comprising at least a densified foam material, said core layer comprising a second density between about 800 kg/m$^3$ to about 900 kg/m$^3$ (about 49.942 lb/ft$^3$ to about 56.185 lb/ft$^3$); said core layer comprising a thickness within a range of about 4 millimeters to about 6 millimeters (between about 0.157 inches to about 0.236 inches);
(c) a plurality of sides with at least one exposed portion extending outwardly from and substantially along a length of one of said plurality of sides, said at least one exposed portion comprising a textured surface structured to represent a grout line,
(d) said at least one exposed portion defined within and exposing said polyvinyl chloride (PVC) layer at a depth below said top surface that is within a range of about 0.9 millimeters to 2 millimeters (about 0.035 inches to 0.079 inches); and
(e) said tile including an interconnecting mechanism formed along at least one of said plurality of sides and corresponding with said at least one exposed portion.

19. The tile as recited in claim 18 wherein said polyvinyl chloride (PVC) layer comprises a thickness within a range of about 1.4 millimeters to about 1.5 millimeters (about 0.055 inches to about 0.059 inches).

20. The tile as recited in claim 18 wherein said polyvinyl chloride (PVC) layer further comprises a colorant selected to correspond to a desired visual appearance of the tile and of said exposed portion having said textured surface that simulates the grout line.

21. A tile comprising:
(a) a top section comprising at least a wear layer, a polyvinyl chloride (PVC) layer and a decorative layer;
  (i) said wear layer at least partially defining a top surface of the tile;
  (ii) said polyvinyl chloride (PVC) layer having a first density between about 2,000 kg/m$^3$ to about 2,400 kg/m$^3$ (about 124.856 lb/ft$^3$ to about 149.827 lb/ft$^3$);
  (iii) said decorative layer disposed between said wear layer and said polyvinyl chloride (PVC) layer, with said wear layer comprising a substantially transparent material such that said decorative layer is visually observable through said wear layer;
(b) a rigid core layer adhesively joined to said top section, said rigid core layer comprising a densified foam material having a second density that is less than the first density of said polyvinyl chloride (PVC) layer;
(c) a plurality of sides with at least one exposed portion extending outwardly from and substantially along a length of one of said plurality of sides, said at least one exposed portion having a textured surface structured to represent a grout line;
(d) said at least one exposed portion defined within and exposing said polyvinyl chloride (PVC) layer at a depth below said top surface that is about 0.9 millimeters (about 0.035 inches); and
(e) said tile including an interconnecting mechanism defined along at least one of said plurality of sides and corresponding with said at least one exposed portion.

* * * * *